(12) United States Patent
McIntosh

(10) Patent No.: US 10,898,035 B2
(45) Date of Patent: *Jan. 26, 2021

(54) PAPER TOWEL DISPENSERS WITH PROJECTION SYSTEMS, SYSTEMS WITH THE SAME, AND ASSOCIATED METHODS

(71) Applicant: The Boeing Company, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,508

(22) Filed: Sep. 30, 2019

(65) Prior Publication Data

US 2020/0121137 A1 Apr. 23, 2020

Related U.S. Application Data

(63) Continuation of application No. 16/168,076, filed on Oct. 23, 2018, now Pat. No. 10,485,388.

(51) Int. Cl.
| | |
|---|---|
| *G03B 21/14* | (2006.01) |
| *A47K 10/36* | (2006.01) |
| *G06F 1/3231* | (2019.01) |
| *G06Q 30/02* | (2012.01) |
| *A47K 10/38* | (2006.01) |

(52) U.S. Cl.
CPC ............ *A47K 10/36* (2013.01); *G03B 21/145* (2013.01); *G06F 1/3231* (2013.01); *A47K 2010/3668* (2013.01); *A47K 2010/389* (2013.01); *G06Q 30/0241* (2013.01)

(58) Field of Classification Search
CPC .... G03B 21/14; G03B 21/145; G03B 21/147; G03B 21/2013; G03B 21/2033; A47K 10/36; A47K 10/424; A47K 10/3612
See application file for complete search history.

(56) References Cited

U.S. PATENT DOCUMENTS

| | | |
|---|---|---|
| 4,408,811 A | 10/1983 | Richardson et al. |
| 7,523,885 B2 | 4/2009 | Lewis |
| 7,841,556 B2 | 11/2010 | Elliott et al. |
| 8,408,487 B2 | 4/2013 | Rodrian et al. |
| 8,646,656 B2 | 2/2014 | Johnson |
| 9,260,189 B2 | 2/2016 | Savian et al. |
| 9,572,460 B2 | 2/2017 | Petocchi et al. |

(Continued)

*Primary Examiner* — Sultan Chowdhury
(74) *Attorney, Agent, or Firm* — Dascenzo Gates Intellectual Property Law, P.C.

(57) ABSTRACT

Paper towel dispensers having projection systems, systems including such paper towel dispensers, and methods for operating such paper towel dispensers are disclosed. A paper towel dispenser having a projection system comprises a paper towel holder configured to securely retain a supply of paper towel during use of the paper towel dispenser, and a dispensing mechanism configured to cause a portion of paper towel to be dispensed out of the paper towel dispenser. The paper towel dispenser also includes a projector configured to emit a quantity of light that strikes the portion of paper towel to create a projected image on the portion of paper towel when the portion of paper towel is dispensed out of the paper towel dispenser.

27 Claims, 8 Drawing Sheets

(56) References Cited

U.S. PATENT DOCUMENTS

| | | |
|---|---|---|
| 9,604,811 B2 | 3/2017 | Case et al. |
| 10,217,328 B2 | 2/2019 | McDade et al. |
| 2017/0369262 A1* | 12/2017 | Green .................. A47K 10/424 |
| 2018/0132676 A1 | 5/2018 | Thomas et al. |

* cited by examiner

PAPER TOWEL DISPENSERS WITH PROJECTION SYSTEMS, SYSTEMS WITH THE SAME, AND ASSOCIATED METHODS

RELATED APPLICATION

This application is a continuation-in-part of and claims priority to U.S. patent application Ser. No. 16/168,076, now U.S. Pat. No. 10,485,388, filed on Oct. 23, 2018, entitled PAPER TOWEL DISPENSERS WITH BACKLIT PROJECTION SYSTEMS, SYSTEMS WITH THE SAME, AND ASSOCIATED METHODS, and the disclosure of which is incorporated herein by reference.

FIELD

The present disclosure relates to paper towel dispensers having projection systems, systems incorporating such paper towel dispensers, and methods for operating such paper towel dispensers.

BACKGROUND

Device manufacturers are always looking for new ways to provide additional value to the purchasers of their paper towel dispensers. For example, one way that paper towel dispensers can provide additional value is to incorporate advertising and/or branding in their paper towel dispensers. Traditional methods of incorporating advertising and/or branding into paper towel dispensers are expensive and struggle to capture the attention of users.

SUMMARY

Paper towel dispensers having projection systems, systems including such paper towel dispensers, and methods for operating such paper towel dispensers are disclosed. A paper towel dispenser having projection systems comprises a paper towel holder configured to securely retain a supply of paper towel during use of the paper towel dispenser, and a dispensing mechanism configured to cause a portion of paper towel to be dispensed out of the paper towel dispenser. The paper towel dispenser also includes a projector configured to emit light that strikes the portion of paper towel to create a projected image on the portion of paper towel when the portion of paper towel is dispensed out of the paper towel dispenser.

A method of operating a paper towel dispenser having projection systems includes dispensing a portion of paper towel out of the paper towel dispenser, and emitting a quantity of light from a projector such that the quantity of light strikes the portion of paper towel. The projector is configured to cause the quantity of light that strikes the portion of paper towel to create a projected image on the portion of paper towel.

DESCRIPTION

Paper towel dispensers having projection systems, systems including such paper towel dispensers, and methods for operating such paper towel dispensers are disclosed. Systems including such paper towel dispensers may be a transportation system (e.g., aircraft, train, maritime vessel, recreational vehicle, etc.) or a non-transportation system (e.g., building, portable restroom, modular home, etc.) Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a given example without departing from the scope of the present disclosure.

Figure 1:
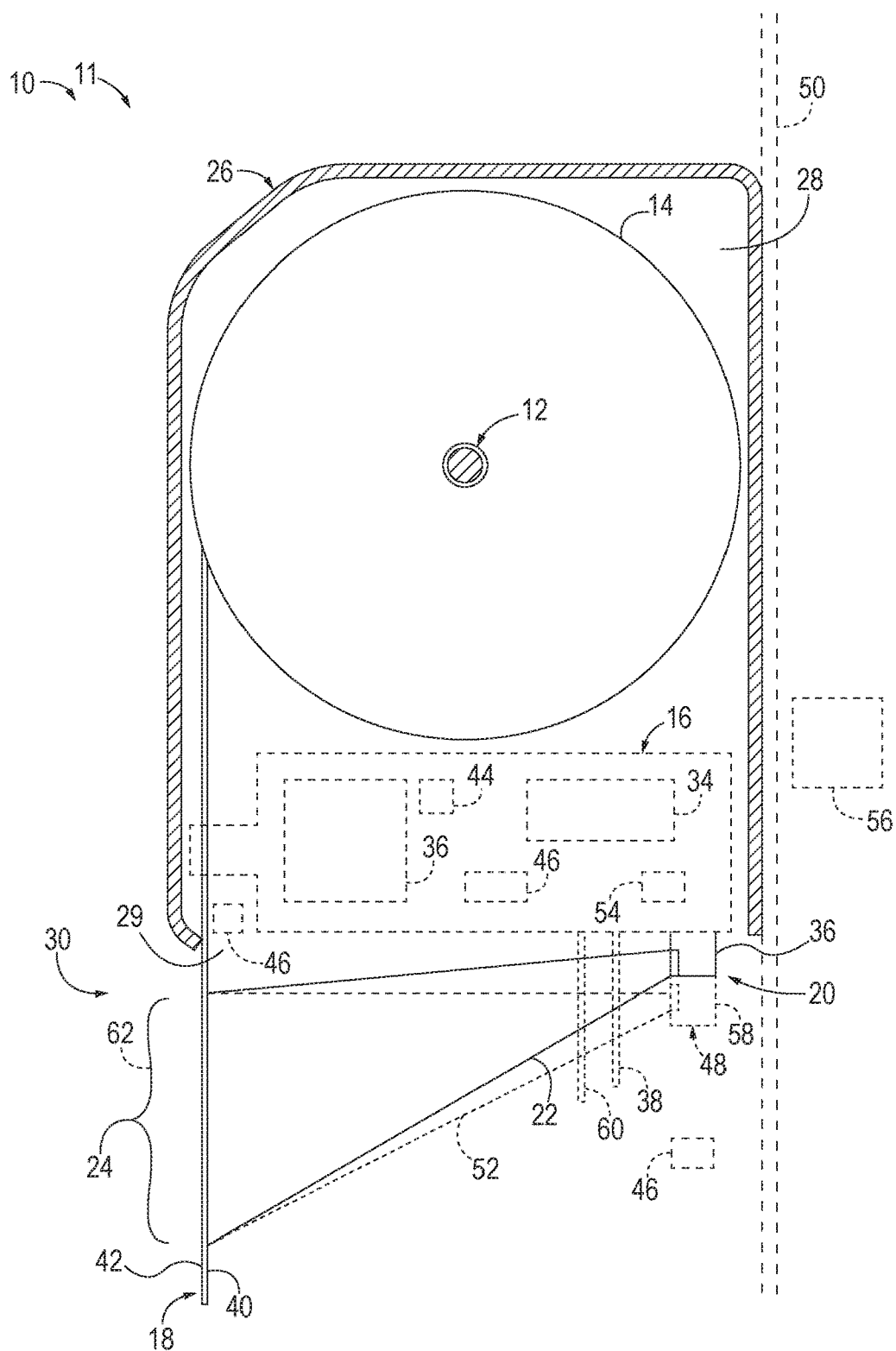
FIG. 1 is a schematic cross-sectional diagram representing paper towel dispensers having backlit projection systems, according to the present disclosure.
Figure 2:
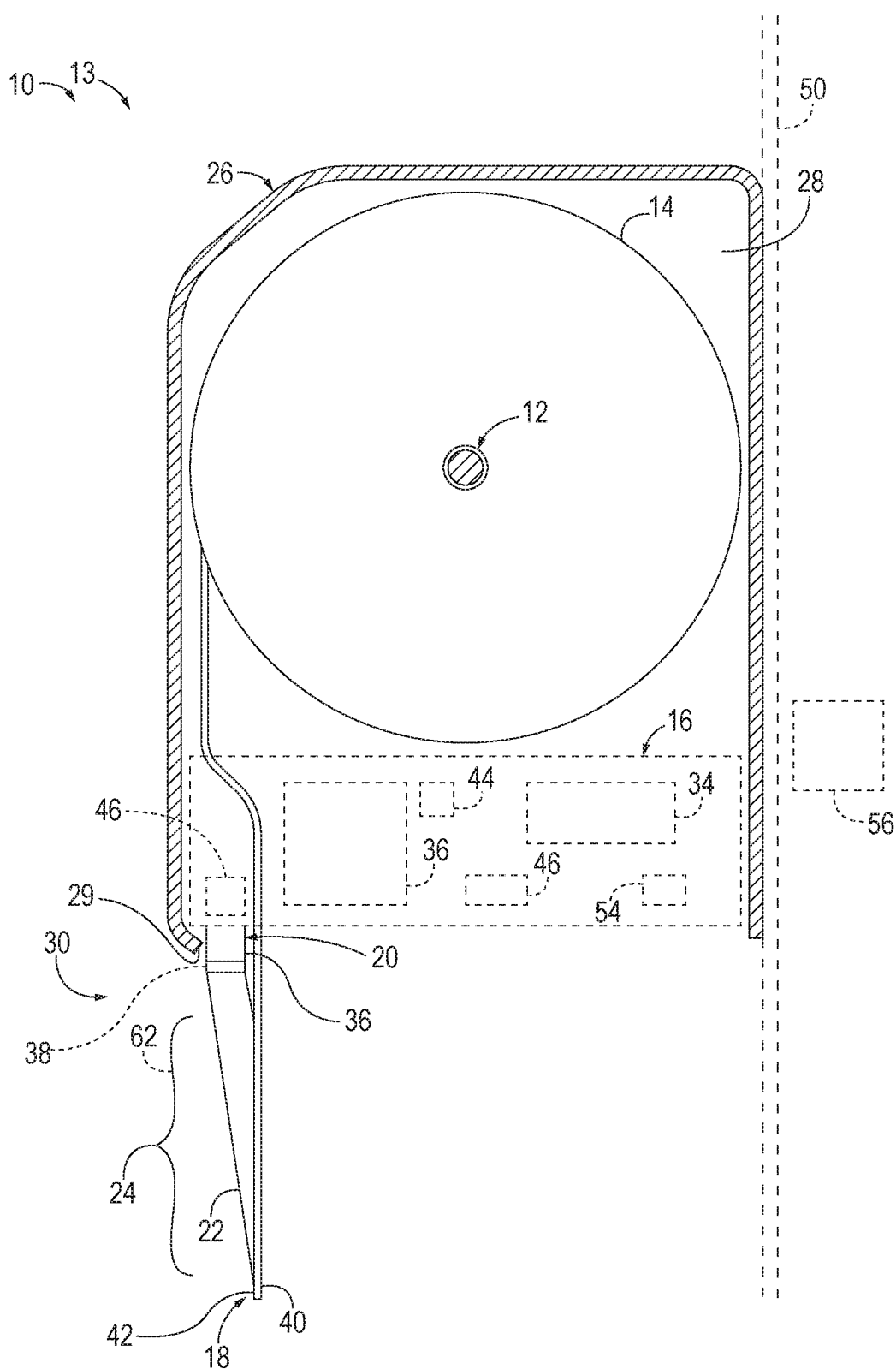
FIG. 2 is a schematic cross-sectional diagram representing paper towel dispensers having frontlit projection systems, according to the present disclosure.

As schematically illustrated in FIGS. 1 and 2, paper towel dispensers 10 having projection systems include at least a paper towel holder 12 configured to securely retain a supply of paper towel 14, and a dispensing mechanism 16 configured to cause a portion 18 of paper towel 14 to be dispensed out of the paper towel dispenser 10. The paper towel dispenser 10 further includes a projector 20 configured to emit a quantity of light 22 that strikes the portion 18 of paper towel 14 to create a projected image 24 on the portion 18 of paper towel 14. Some paper towel dispensers 10 may be described as having backlit projection systems, such as schematically represented in FIG. 1 and designated herein as paper towel dispensers 11, with a projector 20 being positioned toward the rear of the paper towel dispenser 11, such as adjacent a surface 50 to which the paper towel dispenser 11 is mounted, and with the portion 18 extending adjacent the front of the paper towel dispenser 11. Other paper towel dispensers 10 may be described as having frontlit projection systems, such as schematically represented in FIG. 2 and designated herein as paper towel dispensers 13, with a projector 20 being positioned toward the front of the paper towel dispenser 13 relative to the portion 18 of the paper towel 14. The illustrated examples of FIGS. 4, 6, and 8 herein show backlit projection systems; however, the remaining elements and features of such examples apply equally to and may be incorporated into paper towel dispensers having frontlit projection systems.

In the present disclosure and with reference to both FIGS. 1 and 2, the quantity of light 22 striking the portion 18 of paper towel 14 corresponds to light of the quantity of light 22 being completely or partially absorbed, reflected, and/or re-emitted by the surface of the portion 18 of paper towel 14 (e.g., by component particles of the surface). That is, in the present disclosure the term "strike" is used with regard to light to represent the complete or partial absorption, reflection, and/or re-emission of the light by the component particles of the object to which the light "strikes."

The portion 18 of paper towel 14 comprises a back surface 40 that faces the projector 20 when the paper towel dispenser 10 has a backlit projection system (FIG. 1), and a front surface 42 that is opposite the back surface 40 and that faces the projector 20 when the paper towel dispenser 10 has a frontlit projection system (FIG. 2). The quantity of light 22 strikes one of the back surface 40 or the front surface 42 of the portion 18 of paper towel 14, such that the projected image 24 is visible on the front surface 42 of the portion 18 of paper towel 14. For example, when a paper towel dispenser 10 has a backlit projection system, the portion 18 of paper towel 14 is made of a material that allows a portion of the light 22 that strikes the back surface 40 to travel through the portion 18 of paper towel 14 such that the light 22 forms the projected image 24 on the front surface 42. The projected image 24 may be projected onto the back surface 40 of the portion 18 of paper towel 14 as a reverse image. In this way, from the prospective of an end user viewing the front surface 42 of the portion 18 of paper towel 14, the projected image 24 is viewed in its correct orientation. On the other hand, when a paper towel dispenser 10 has a frontlit projection system, the paper towel 14 need not be of a material that allows a portion of the light 22 to travel through the portion of paper towel, since the light 22 will strike the front surface 42, which will be directly visible to an end user.

The paper towel dispenser 10 may further include a casing 26 that defines an inner volume 28. The paper towel dispenser 10 may be mounted on a surface 50. When a paper towel dispenser 10 includes a backlit projection system (FIG. 1), the projector 20 may be positioned between the surface 50 and the portion 18 of the paper towel 14 when the portion 18 of paper towel 14 is dispensed. On the other hand, when a paper towel dispenser 10 includes a frontlit projection system (FIG. 2), the portion 18 of the paper towel 14 may be positioned between the surface and the projector 20.

The paper towel holder 12 is located within the inner volume 28 and is configured to securely retain a supply of paper towel 14 during operation of the paper towel dispenser 10. In some embodiments, the paper towel holder 12 allows the supply of paper towel 14 to rotate in response to a tension on the portion 18 of paper towel 14. For example, where the supply of paper towel 14 is a paper towel roll or spool of paper towel, the paper towel holder 12 may allow the paper towel roll to rotate so as to enable the portion 18 of paper towel 14 to be fed from the paper towel roll and to the dispensing mechanism 16. In such embodiments, the paper towel holder 12 may include a structural component extending inwardly into the inner volume 28 and configured to extend into the roll of paper towel.

The dispensing mechanism 16 may be positioned at least partially within the inner volume 28 and configured to cause the portion 18 of the paper towel 14 to be dispensed from the inner volume 28 to a region 30 outside of the paper towel dispenser 10 via the housing aperture 29. The dispensing mechanism 16 may be partially or completely composed of a low flammability material. In some embodiments, the dispensing mechanism 16 may be actuated by an end user, such as a passenger of a transportation vehicle, such as an aircraft. Alternatively, the dispensing mechanism 16 may automatically dispense the portion 18 of paper towel 14. For example, the dispensing mechanism 16 may include a motor 32 that is configured to drive the operation of the dispensing mechanism 16, and a power source 34 to drive the motor 32.

In various embodiments, the power source 34 may include a battery, or a connection to an external electrical system such as an electrical grid.

The projector 20 may include a light source 36 configured to emit the light 22. The light source 36 is positioned such that the light 22 strikes the portion 18 of paper towel 14 when the portion 18 of paper towel 14 is dispensed out of the paper towel dispenser 10. In some embodiments the projector 20 is a video projector, and the projected image 24 is a video image. For example, the projector 20 may correspond to one of a liquid crystal display (LCD) projector, a digital light processing (DLP) projector, a GOBO projector, a micro projector, a laser light projector, and the likes thereof.

Alternatively, the projector 20 also may include a go before optics (GOBO) 38 positioned between the light source 36 and the portion 18 of paper towel 14 when the portion 18 of paper towel 14 is dispensed out of the paper towel dispenser 10. The GOBO 38 is configured to cause the quantity of light 22 that strikes the portion 18 of paper towel 14 to create the projected image 24 on the portion 18 of paper towel 14. For example, a GOBO 38 may be a device placed in "the gate" or at a "point of focus" between the light source 36 and the lenses or other optics, such that the GOBO 38 interacts with the quantity of light 22 to create the projected image 24. In some embodiments of the paper towel dispenser 10, the GOBO 38 may be configured to be selectively removed and replaced without damage to the paper towel dispenser 10. The interchangeability of GOBO 38 allows a user to choose and/or change the projected image 24 over time. For example, during a holiday season a first GOBO 38 configured to cause the light 22 to form a standard image on the portion 18 of paper towel 14 may be replaced with a second GOBO 38 that is configured to cause the light 22 to form a holiday themed image. In various embodiments, the projected image 24 may include one or more branded images. For example, the projected image 24 may correspond to an advertisement and/or promotional image.

In some embodiments, the GOBO 38 may comprise a lens having a pattern that causes the light 22 that strikes the pattern to cause the projected image 24 to be projected. For example, the lens may be a lens of the light source 36. The pattern may be etched on the lens, printed on the lens, or a combination thereof. Alternatively, or in addition, the GOBO 38 may comprise an object that defines one or more apertures that cause the quantity of light 22 that strikes the portion 18 of paper towel 14 to create a projected image 24. For example, the GOBO 38 may be a slide or other material that defines a GOBO aperture that is shaped to allow a portion of the light 22 to pass through the GOBO 38, where the portion of light 22 creates the projected image 24 on the portion 18 of paper towel 14 that the portion of light strikes. The GOBO 38 may be a static GOBO configured to create a static image, or may be a dynamic GOBO that is configured to create a video image.

The paper towel dispenser 10 optionally may include a microcontroller 44 configured to cause the projector 20 to switch between an on state where the projector 20 emits the quantity of light 22 and an off state where the projector 20 does not emit the quantity of light 22. In some embodiments, the microcontroller 44 is configured to cause the projector 20 to switch to the off state in response to a usage event (e.g., a tearing of the portion 18 of paper towel 14, a usage of the paper towel dispenser 10, and/or a removal of the portion 18 of paper towel 14). In this way, when the portion 18 of paper towel 14 is removed by a person using the paper towel dispenser 10, the light 22 does not strike the person. Alternatively or in addition, where the projector 20 is a video projector, the microcontroller 44 also may be configured to initiate and/or pause the playback of a projected video image.

The microcontroller 44 may be configured to detect the occurrence of a usage event using one or more sensors 46. In various embodiments, the one or more sensors 46 may include, but are not limited to, an infrared sensor, a camera sensor, a light sensor, a proximity sensor, and a mechanical sensor. The one or more sensors 46 may include sensors that are incorporated within the paper towel dispenser 10 and/or sensors that are incorporated within the environment around the paper towel dispenser 10. For example, the one or more sensors 46 may be included within the motor 32 and/or the dispensing mechanism 16, may be coupled to the casing 26 of the paper towel dispenser 10, or a combination thereof. For example, a sensor 46 may be incorporated within one of the dispensing mechanism 16 and the motor 32 such that they are configured to detect a usage event. In some embodiments, a sensor 46 may be configured to detect the closing and/or locking of a lavatory door and the microcontroller 44 may be configured to cause the projector 20 to emit light 22 in response to the lavatory door being closed and/or locked.

In some embodiments, the microcontroller 44 is configured to detect a usage event by the one or more sensors 46 detecting a tension force being applied to the portion 18 of paper towel 14. Thus, in response to the motor 32 and/or a sensor 46 incorporated in the motor 32 detecting a person gripping and pulling away and/or tearing the portion 18 of paper towel 14, the microcontroller 44 causes the projector 20 to switch to the off state. Alternatively or in addition, the microcontroller 44 may detect a usage event by the one or more sensors 46 detecting the presence of an object proximate to the portion 18 of paper towel 14, and/or an absence of the portion 18 of paper towel 14. For example, in response to an infrared sensor detecting that the portion 18 of paper towel 14 is no longer within the region 30 outside of the casing 26, the microcontroller 44 may cause the projector 20 to switch to the off state. In another example, the microcontroller 44 may cause the projector 20 to switch to the off state in response to the one or more sensors 46 detecting a hand within the region 30 outside of the paper towel dispenser 10.

The microcontroller 44 also may be configured to control the motor 32. For example, the microcontroller 44 may be configured to actuate the motor 32 so that the portion 18 of paper towel 14 and/or an additional portion of paper towel is dispensed from the paper towel dispenser 10. Thus, in response to a usage event where the portion 18 of paper towel 14 is removed, the microcontroller 44 can actuate the motor 32 so as to cause the dispensing mechanism 16 to dispense an additional portion of paper towel out of the paper towel dispenser 10. In some embodiments, the microcontroller 44 may actuate the motor 32 after the passage of a predetermined amount of time from the usage event.

The microcontroller 44 further may cause the projector 20 to switch to the on state in response to the passage of a predetermined amount of time from the usage event, an actuation of the dispensing mechanism 16, an actuation of the motor 32, an additional portion of paper towel being dispensed out of the paper towel dispenser 10, or a combination thereof.

In some embodiments, the microcontroller 44 is configured to determine that a sleep condition has occurred, and to cause the projector 20 to switch to the off state based on the sleep condition having occurred. A sleep condition may correspond to the occurrence of one or more events that evidence a condition in which the projector 20 is to be turned off. For example, a sleep condition may correspond to a lavatory door being open, the paper towel dispenser 10 not being used for a predetermined period of time, no motion being detected in the environment for a period of time, an external light source being off, a time schedule, etc. A sleep state may correspond to the projector 20 being turned off, operating in a low power mode, not emitting light, operating in a standby mode, etc. In this way, the microcontroller 44 causes the projector 20 to save power by not emitting light in situations where there is no person present in the environment to view the projected image 24. Additionally, the microcontroller 44 further may be configured to determine that a wake condition has occurred, and cause the projector 20 to switch from the sleep state to a normal state of operation based on the wake condition having occurred. A wake condition may correspond to an occurrence of one or more events that evidence a condition in which the projector 20 is to be turned on. For example, a wake condition may correspond to a lavatory door being closed, a lavatory door being locked, a use of the paper towel dispenser 10, motion being detected in the environment, an external light source being on, a time schedule, etc.

In some embodiments, the dispensing mechanism 16 further includes a transmitter 54 configured to transmit data describing a status of the paper towel dispenser 10 to a computing device 56 external to the paper towel dispenser 10. The transmitter 54 may be a wireless transmitter, or may be a wired interface configured to transmit the data via a physical connection. The microcontroller 44 may further be configured to determine status information indicative of a status of the paper towel dispenser 10, and cause the transmitter 54 to transmit data indicating the status information to the computing device 56. The status information may correspond to one or more of a battery power level, an amount of paper towel dispensed, an amount of paper towel remaining, an operational status of the paper towel dispenser 10, and a detection of an operational fault. As shown in FIG. 1 in connection with paper towel dispensers 11, but applying equally to paper towel dispensers 13, a paper towel dispenser 10 optionally may include one or more additional projectors 48 that are configured to emit an additional quantity of light 52 such that strikes the portion 18 of paper towel 14 when the portion 18 of paper towel 14 is dispensed out of the paper towel dispenser 10. In such embodiments, an additional projector 48 may comprise an additional light source 58 configured to emit the additional quantity of light 52. A GOBO 38 may be positioned between the additional light source 58 and the portion 18 of paper towel 14 when the portion 18 of paper towel 14 is dispensed out of the paper towel dispenser 10. The GOBO 38 further may be configured to cause the additional quantity of light 52 that strikes the portion 18 of paper towel 14 to create an additional projected image 62. Alternatively or in addition, the paper towel dispenser 10 may include an additional GOBO 60 positioned between the additional projector 48 and the portion 18 of paper towel 14, and configured to cause the additional quantity of light 52 to form the additional projected image 62 on the portion 18 of the paper towel 14. Where the paper towel dispenser 10 includes an additional projector 48, the microcontroller 44 may be further configured to cause the additional projector 48 to switch between an on state where the additional projector 48 emits the additional quantity of light 52 and an off state where the additional projector 48 does not emit the additional quantity of light 52.

Turning now to FIGS. 3-8, illustrative non-exclusive examples of paper towel dispensers 10 having projection systems are illustrated. Where appropriate, the reference numerals from the schematic illustrations of FIGS. 1 and 2 are used to designate corresponding parts of the examples of FIGS. 3-8; however, the examples of FIGS. 3-8 are non-exclusive and do not limit paper towel dispensers 10 to the illustrated embodiments of FIGS. 3-8. That is, paper towel dispensers 10 having projection systems are not limited to the specific embodiments of FIGS. 3-8, and paper towel dispensers 10 may incorporate any number of the various aspects, configurations, characteristics, properties, etc. of paper towel dispensers 10 that are illustrated in and discussed with reference to the schematic representations of FIGS. 1 and 2 and/or the embodiments of FIGS. 3-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-8; however, it is within the scope of the present disclosure that the previously discussed features, variants, etc. may be utilized with the examples of FIGS. 3-8.

Figure 3:
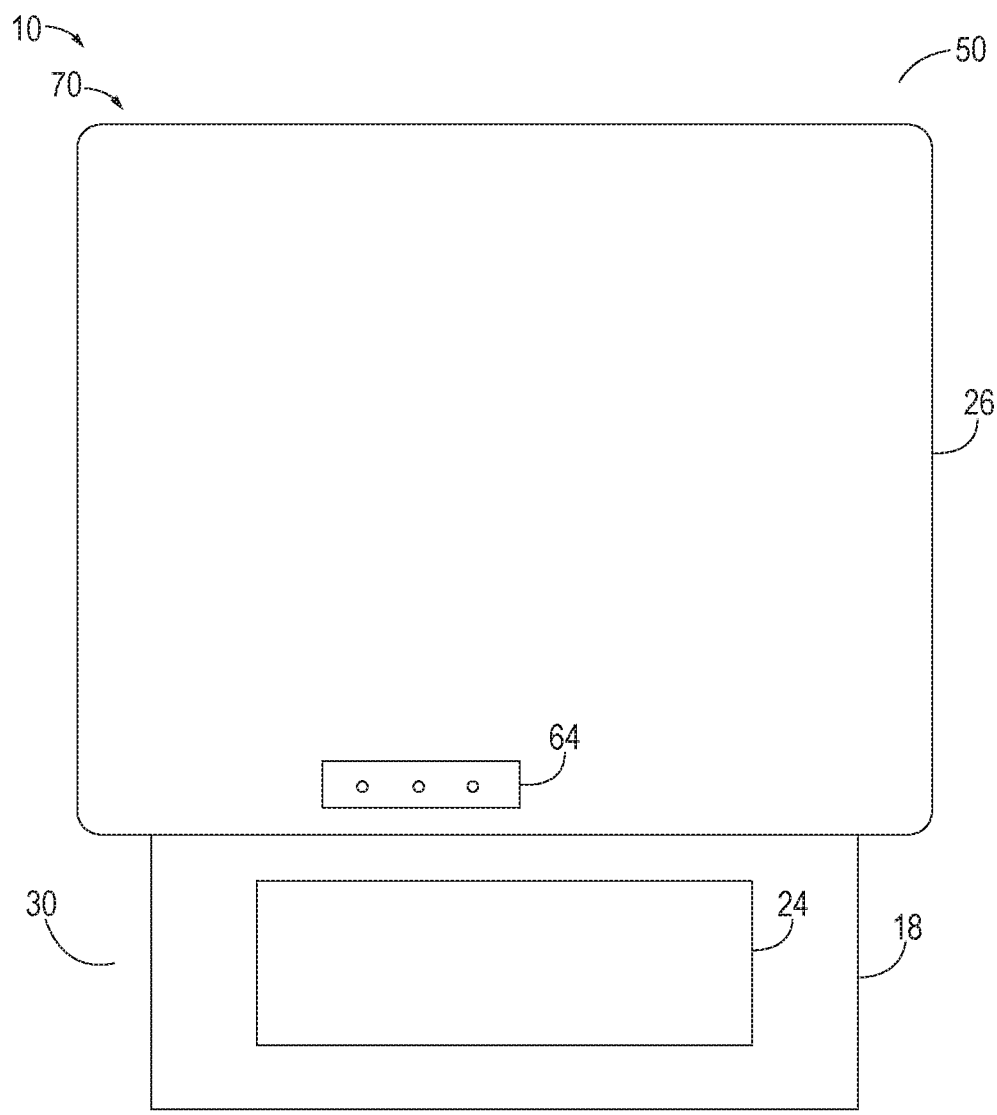
FIG. 3 is an example paper towel dispenser having a projection system that includes a casing.

FIG. 3 illustrates a paper towel dispenser 70 having a projection system that is an example of paper towel dispensers 10 that include a casing 26. The paper towel dispenser 70 includes a casing 26 that defines an inner volume 28 that includes a paper towel holder 12 configured to securely retain a supply of paper towel 14 (not pictured in FIG. 3). The paper towel dispenser 70 further includes a projector 20 (not pictured in FIG. 3) configured to emit light 22 that strikes the portion 18 of paper towel 14 to create a projected image 24 on the portion 18 of paper towel 14. In various embodiments, the projected image 24 may be a static image, a dynamic image (e.g., slide show, video, animation, etc.), or a combination thereof. The paper towel dispenser 70 is mounted on a surface 50. The paper towel dispenser 70 further includes a status indicator 64 that presents status information relating to the paper towel dispenser 70. The status information may correspond to one or more of a battery power level, an amount of paper towel 14 dispensed, an amount of paper towel 14 remaining, an operational status of the paper towel dispenser 70, and a detection of an operational fault.

Figure 4:
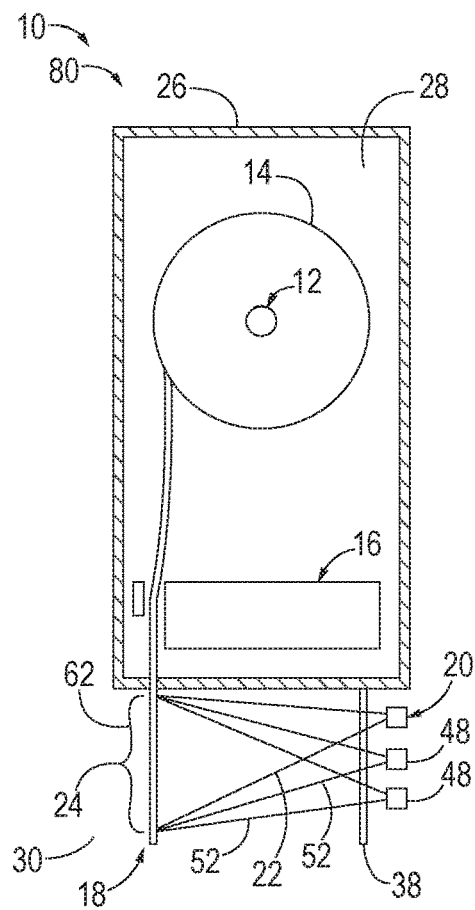
FIG. 4 is a cross sectional view of an example paper towel dispenser having a projection system that includes multiple projectors.

FIG. 4 illustrates a cross section of a paper towel dispenser 80 having a backlit projection system that is an example of paper towel dispensers 10 that include multiple projectors. The paper towel dispenser 80 includes a casing 26 that defines an inner volume 28 that includes a paper towel holder 12 configured to securely retain a supply of paper towel 14, and a dispensing mechanism 16 configured to cause a portion 18 of paper towel 14 to be dispensed into a region 30 outside of the paper towel dispenser 80. The paper towel dispenser 80 further includes a projector 20 and multiple additional projectors 48 configured to emit light 22 and 52 that strikes a GOBO 38 and/or an additional GOBO 60 which causes the light striking the portion 18 of paper towel 14 to create a projected image 24 and additional projected images 62 on the portion 18 of paper towel 14. In some embodiments, the projector 20 and the multiple additional projectors 48 may be configured to simultaneously emit light so that a projected image 24 is formed, to emit light at different times so that the projected image 24 changes over time (e.g., is animated), or a combination thereof.

Figure 5:
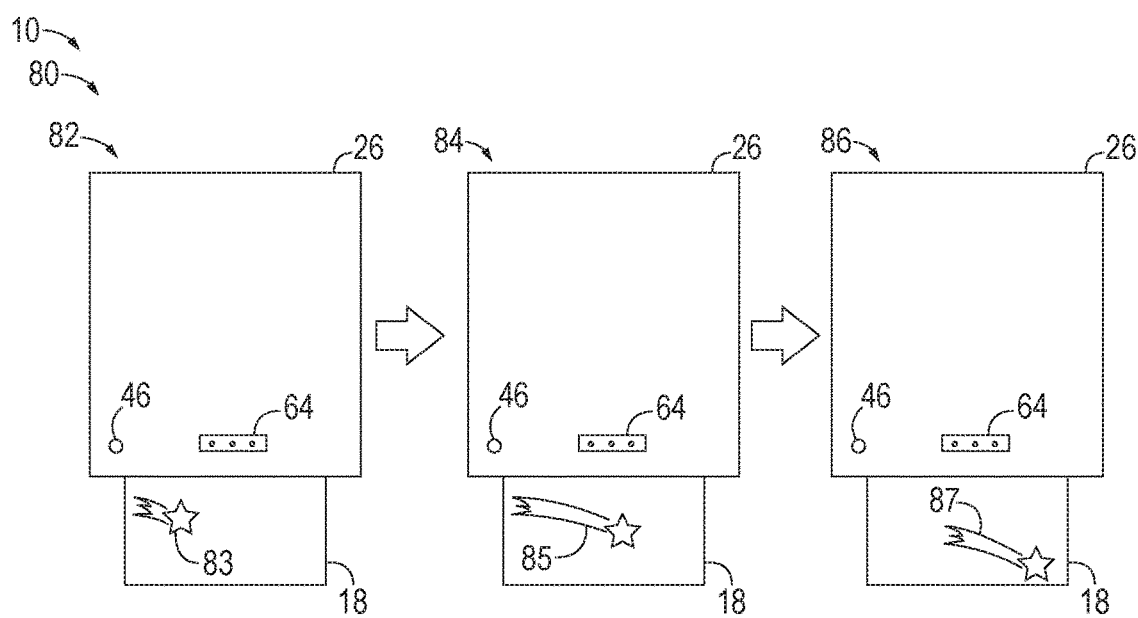
FIG. 5 illustrates a series of front views of the paper towel dispenser illustrated in FIG. 4 over time.

FIG. 5 illustrates the paper towel dispenser 80 having a projection system where the image projected on the portion of paper towel changes over time. Specifically, FIG. 5 illustrates the paper towel dispenser 80 at a first time 82, the paper towel dispenser 80 at a second time 84, and the paper towel dispenser 80 at a third time 86. At the first time 82, a first projected image 83 is projected onto the portion 18 of paper towel 14 by a projector 20 (not pictured in FIG. 5) of the paper towel dispenser 80. At the second time 84, a second projected image 85 is projected onto the portion 18 of paper towel 14 by an additional projector 48. At the third time 86, a third projected image 87 is projected onto the portion 18 of paper towel 14 by an additional projector 48. Thus, over time, the paper towel dispenser 80 is configured to project an animated image (depicted in FIG. 5 as a shooting star) on the portion 18 of paper towel 14. FIG. 5 further illustrates a sensor 46 and a status indicator 64 coupled to the casing 26 of the paper towel dispenser 80.

Figure 6:
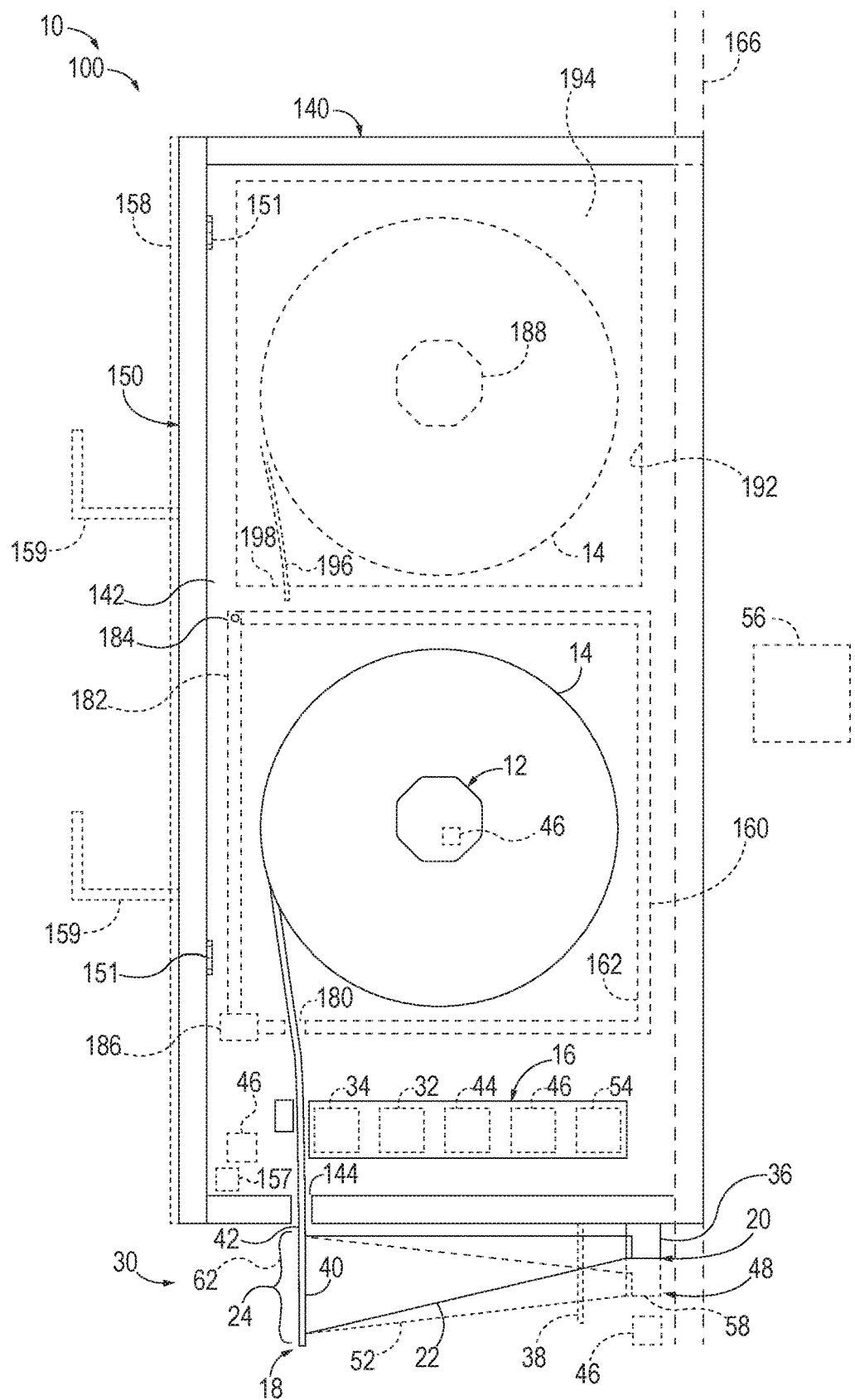
FIG. 6 is a schematic cross-sectional diagram representing paper towel dispensers having projection systems that are incorporated into a cabinet housing.

FIG. 6 is a schematic illustration of a paper towel dispenser 100 having backlit projection systems that is an example of paper towel dispensers 10 and that is incorporated into a cabinet housing 140. The paper towel dispenser 100 includes at least cabinet housing 140, a paper towel holder 12, a dispensing mechanism 16, and a projector 20 configured to emit light 22 that strikes a portion 18 of paper towel 14 to create a projected image 24 on the portion 18 of paper towel 14 when dispensed into a region 30 outside of the paper towel dispenser 100.

Cabinet housing 140 defines an inner volume 142 and a housing aperture 144 that is configured to allow a portion 18 of paper towel 14 to be dispensed from the inner volume 142 to a region 30 outside of the paper towel dispenser 100. In some embodiments, the cabinet housing 140 may be located within a lavatory, such as the lavatory of transportation vehicle, such as an aircraft, maritime vehicle, train, etc. Alternatively, the cabinet housing 140 may be located within a different location, such as a kitchen, or galley, area, an egress area, a crew rest area, or another location where access to paper towels is desired. For example, the cabinet housing 140 may also be incorporated into a transportation system (e.g., aircraft, train, maritime vessel, recreational vehicle, etc.) or a non-transportation system (e.g., building, portable restroom, modular home, etc.).

The cabinet housing 140 may be composed of a composite material, such as one or more composite sandwich panels. In some embodiments, the cabinet housing 140 may include an EMI shield to protect against electromagnetic signals being transmitted into or out of the inner volume 142.

The housing aperture 144 may be defined by the cabinet housing 140 to have a shape that allows the portion 18 of paper towel 14 to pass from the inner volume 142 to the region 30 outside of the paper towel dispenser 100 via the housing aperture 144. When in the region 30 outside of the paper towel dispenser 100, the portion 18 of paper towel 14 is exposed so as to allow an aircraft passenger to grip and remove the portion 18 of paper towel 14.

The cabinet housing 140 also includes a vanity cover 150. The vanity cover 150 is mechanically coupled to a portion of the cabinet housing 140 via one or more vanity attachment mechanisms 151. The vanity attachment mechanisms 151 are configured to allow the vanity cover 150 to be selectively translated between one or more open states in which the inner volume 142 is accessible, and a closed state in which the inner volume 142 is not accessible. In FIG. 6, the vanity cover 150 is illustrated as being in a closed state. In some embodiments, the cabinet housing 140 also includes one or more vanity latch mechanisms 157 that are configured to selectively retain the vanity cover 150. The vanity latch mechanisms 157 may be able to switch between a locked state in which the vanity latch mechanisms 157 restrict the vanity cover 150 from transitioning between a closed state and an open state, and an unlocked state in which the vanity cover 150 is able to freely transition between the open state and the closed state. In some embodiments, the vanity cover 150 may include a mirrored surface 158 opposite the inner volume 142. For example, the mirrored surface 158 may correspond to, or be part of, a mirror within a lavatory. Alternatively or in addition, the vanity cover 150 may include one or more shelves 159 configured to store items.

The paper towel holder 12 is located within the inner volume 142 and configured to securely retain a supply of paper towel 14. The paper towel holder 12 may allow a paper towel roll to rotate so as to enable the portion 18 of paper towel 14 to be fed from the paper towel roll to the dispensing mechanism 16. In some embodiments, the paper towel holder 12 allows the supply of paper towel 14 to rotate in response to a tension on the portion 18 of paper towel 14. For example, where the supply of paper towel 14 corresponds to a paper towel roll, the paper towel holder 12 may include a structural component extending inwardly into the inner volume 142 and configured to extend into the paper towel roll.

Additionally, the dispensing mechanism 16 is positioned within the inner volume 142 and configured to cause the portion 18 of paper towel 14 to be dispensed from the inner volume 142 to the region 30 outside of the paper towel dispenser 100 via the housing aperture 144. The dispensing mechanism 16 may be partially or completely composed of a low flammability material. For example, the dispensing mechanism 16 may be composed of materials that comply with stringent flammability requirements specifically and uniquely for aircraft environments (e.g., FAA certification requirements). In some embodiments, the dispensing mechanism 16 may be actuated by a person. Alternatively, the dispensing mechanism 16 may automatically dispense the portion 18 of paper towel 14. For example, the dispensing mechanism 16 may include a motor 32 that is configured to drive the operation of the dispensing mechanism 16, and a power source 34 to drive the motor 32. In various embodiments, the power source 34 may include a battery, or a connection to an electrical system (e.g., electrical grid). In some embodiments, the paper towel dispenser 100 may further comprises a backup hand crack that is configured to allow paper towel to be manually dispensed from the paper towel dispenser 100 in the event of a failure of the dispensing mechanism 16.

As illustrated in FIG. 6, the dispensing mechanism 16 optionally includes a microcontroller 44. In some embodiments, the dispensing mechanism 16 further includes a transmitter 54 configured to transmit data describing the status of the paper towel dispenser 100 to a computing device 56 external to the paper towel dispenser 100. The transmitter 54 may be a wireless transmitter, or may be a wired interface configured to transmit the data via a physical connection.

In some embodiments, the paper towel dispenser 100 further includes one or more sensors 46 configured to detect sensor information relating to the status of the paper towel dispenser 100 and/or the environment thereof. Individual sensors 46 of the one or more sensors 46 may correspond to capacitance sensors, optical sensors, mechanical sensors, ultrasonic sensors, touch sensors, proximity sensors, infrared sensors, pressure sensors, microphones, voltage sensors, tension sensors, piezoelectric sensors, linear encoders, rotary encoders, etc.

In some embodiments, at least one sensor 46 of the one or more sensors 46 is configured to detect the presence of an object (e.g., a person, a hand of a person, etc.) proximate to the paper towel dispenser 100, and the dispensing mechanism 16 is configured to dispense the portion 18 of paper towel 14 in response to a detection of the presence of the object. Alternatively or in addition, the paper towel dispenser 100 may comprise a sensor 46 that is configured to detect that the portion 18 of paper towel 14 has been removed, and the dispensing mechanism 16 is configured to dispense an additional portion 18 of paper towel 14 after a predetermined period of time has passed after the portion 18 of paper towel 14 is removed.

As illustrated in FIG. 6, the paper towel dispenser 100 optionally may include a suppression casing 160 positioned within the inner volume 142. The suppression casing 160 comprises a suppression wall 162 that defines an enclosed storage volume 164. The suppression casing 160 may be partially or completely composed of a low flammability material. For example, the suppression casing 160 may be composed of materials that comply with stringent flammability requirements specifically and uniquely for aircraft environments (e.g., FAA certification requirements). In various embodiments, the suppression casing 160 may be mechanically coupled to the cabinet housing 140, or a frame 166. For example, the suppression casing 160 may be directly coupled to the frame 166 of a wall of the lavatory of a building. Additionally, in embodiments where the paper towel dispenser 100 includes the suppression casing 160, the paper towel holder 12 is operationally coupled to the suppression wall 162 and within the enclosed storage volume 164, while the dispensing mechanism 16 is located outside of the suppression casing 160. The suppression casing 160 is configured to secure the supply of paper towel 14 during an event where the paper towel dispenser 100 is jostled.

The suppression wall 162 defines a suppression aperture 180 that is configured to allow the portion 18 of paper towel 14 to be dispensed from the supply of paper towel 14 within the enclosed storage volume 164 to the dispensing mechanism 16. In some embodiments, the suppression wall 162 is configured to limit a flow of air into the enclosed storage volume 164. For example, the suppression wall 162 may be configured so that air is only allowed into the enclosed storage volume 164 via the suppression aperture 180. In some embodiments, the suppression aperture 180 is shaped to allow the portion 18 of paper towel 14 to be dispensed from within the enclosed storage volume 164 while limiting the flow of air into the enclosed storage volume 164. Alternatively or in addition, one or more sealing components may extend from the suppression wall 162 so as to restrict airflow between the enclosed storage volume 164 and the inner volume 142. For example, a malleable material may extend from the suppression wall 162 and proximate to the portion 18 of paper towel 14 as the portion 18 of paper towel 14 passes through the suppression aperture 180. In this way, the suppression aperture 180 and/or the suppression wall 162 are configured to limit the flow of air into the enclosed storage volume 164 such that the airflow is insufficient to sustain a flame within the enclosed storage volume 164. Because of this, any portion 18 of paper towel 14 that is ignited will be extinguished within the enclosed storage volume 164 due to lack of oxygen.

The suppression casing 160 may include an access door 182 that is mechanically coupled to a portion of the suppression casing 160 via one or more suppression attachment mechanisms 184. The suppression attachment mechanisms 184 are configured to allow the access door 182 to be selectively translated between one or more open states in which the supply of paper towel 14 can be refilled or removed from the paper towel holder 12, and a closed state in which the supply of paper towel 14 is secured within the enclosed storage volume 164. In FIG. 6, the access door 182 is illustrated as being in a closed state. In some embodiments, the cabinet housing 140 also includes one or more suppression latch mechanisms 186 that are configured to selectively retain the access door 182. The suppression latch mechanisms 186 may be able to switch between a locked state in which the suppression latch mechanisms 186 restrict the access door 182 from transitioning between a closed state and an open state, and an unlocked state in which the access door 182 is able to freely transition between the open state and the closed state. One or more of the paper towel holder 12, the suppression casing 160, the vanity cover 150, and/or the suppression latch mechanisms 186, are designed to retain items of mass within the paper towel dispenser 100, either as individual components, or operating in unison to comply with stringent dynamic structural requirements specifically and uniquely for aircraft environments (e.g., FAA certification requirements).

In some embodiments, the paper towel dispenser 100 may include one or more additional paper towel holders 188 that are each configured to securely retain an additional supply of paper towel 14. The additional paper towel holders 188 may be located within the inner volume 142 or the enclosed storage volume 164 and mechanically coupled to one of the cabinet housing 140 and/or the suppression casing 160. Additionally, in embodiments where the paper towel dispenser 100 includes an additional suppression casing 192 that defines an additional enclosed storage volume 194, an additional paper towel holder 188 may be located within the additional enclosed storage volume 194 and mechanically coupled to the additional suppression casing 192 such that an additional portion 196 of paper towel 14 can be dispensed from within the additional enclosed storage volume 194 to the dispensing mechanism 16 via an additional suppression aperture 198. In some embodiments, suppression casing 160 and additional suppression casing 192 may be separate enclosures. Alternatively, suppression casing 160 and additional suppression casing 192 may be combined into a single enclosure, or may not be included at all.

Figure 7:
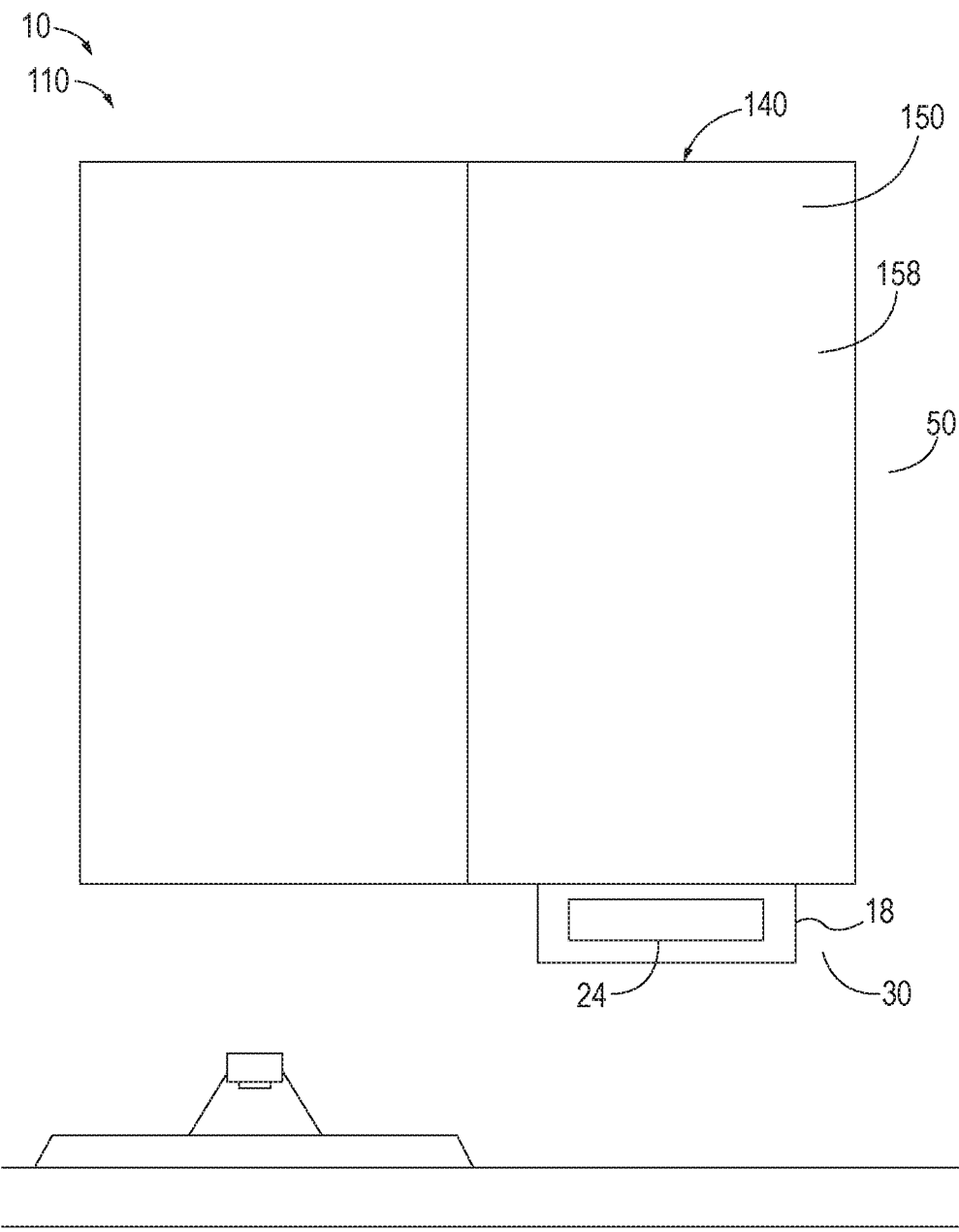
FIG. 7 is an example paper towel dispenser having a projection system that is incorporated into a cabinet housing.

FIG. 7 illustrates a paper towel dispenser 110 having a projection system that is an example of paper towel dispensers 10 that is incorporated into a cabinet housing. Paper towel dispenser 110 includes a cabinet housing 140 that defines an inner volume 142 (not pictured in FIG. 7) and a housing aperture 144 (not pictured in FIG. 7). The housing aperture 144 is configured to allow a portion 18 of paper towel 14 to be dispensed from the inner volume 142 to a region 30 outside the paper towel dispenser 110. Paper towel dispenser 110 further includes a vanity cover 150. In FIG. 7, the vanity cover 150 is illustrated as being in a closed state where the vanity cover 150 obscures the view of a paper towel holder 12, a supply of paper towel 14, a dispensing mechanism 16, the inner volume 142, and other components within the inner volume 142. The vanity cover 150 comprises a mirrored surface 158.

The paper towel dispenser 110 further includes a projector 20 (not pictured in FIG. 7) configured to emit light 22 that strikes the portion 18 of paper towel 14 to create a projected image 24 on the portion 18 of paper towel 14. In various embodiments, the projected image 24 may be a static image, a dynamic image (e.g., slide show, video, animation, etc.), or a combination thereof. The paper towel dispenser 110 is mounted on a surface 50. The projector 20 is positioned between the surface 50 and the portion 18 of the paper towel 14 when the portion 18 of paper towel 14 is dispensed into a region 30 outside the paper towel dispenser 110.

Figure 8:
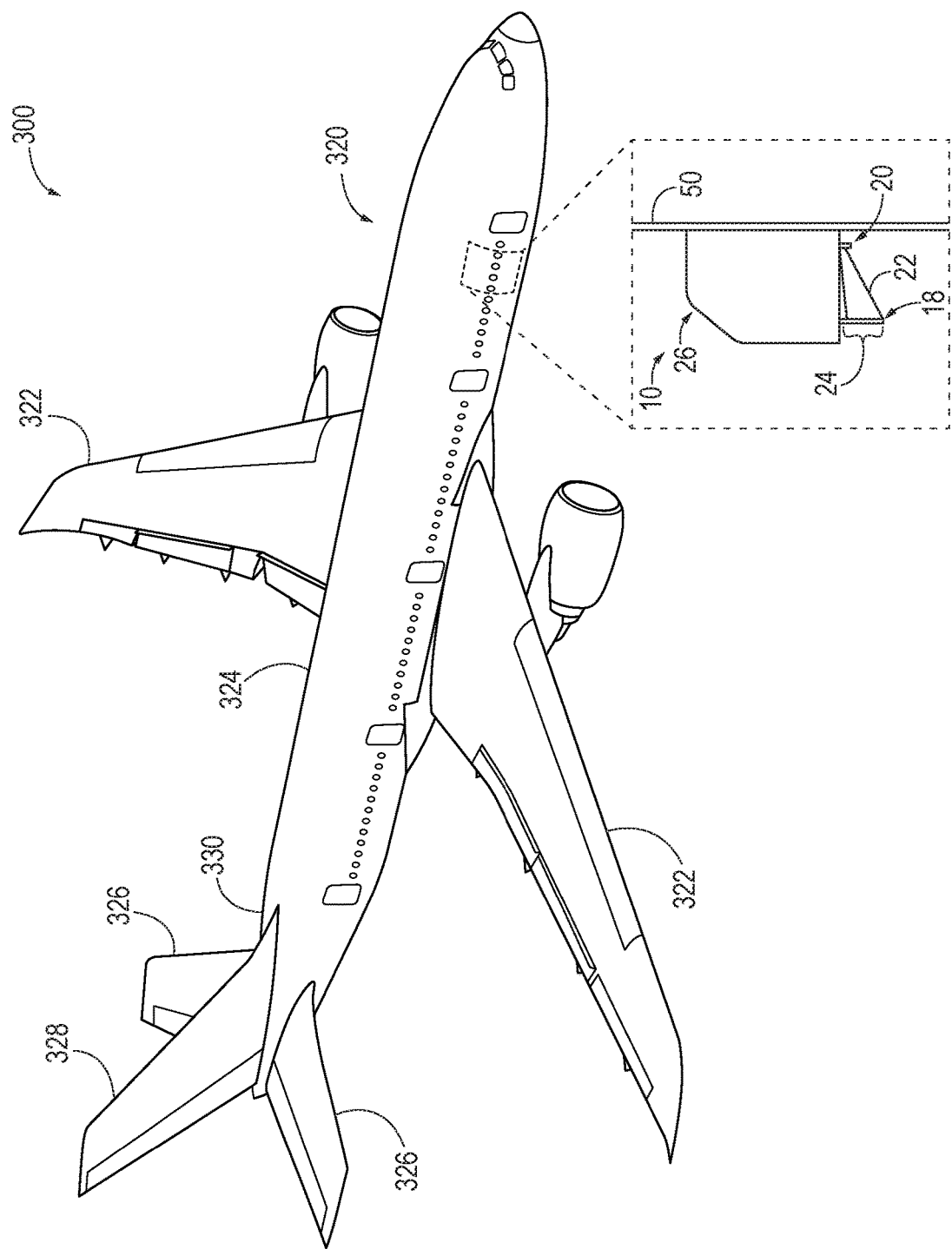
FIG. 8 is a perspective view of an example aircraft that includes a paper towel dispenser having a projection system according to the present disclosure.

FIG. 8 is a schematic representation of an illustrative, non-exclusive example of a mechanical system 300, such as an aircraft 320, that may be utilized with and/or include the systems and methods according to the present disclosure. Aircraft 320 includes wings 322 that are attached to a fuselage 324. Aircraft 320 also may include horizontal stabilizers 326 and a vertical stabilizer 328 that are attached to a tail 330. Aircraft 320 further includes a paper towel dispenser 10 having a projection system. The paper towel dispenser 10 includes a casing 26, and is mounted on a surface 50. For example, the surface 50 may be a frame and/or wall of an aircraft lavatory. The paper towel dispenser 10 further includes a projector 20 configured to emit light 22 that strikes a portion 18 of paper towel 14 to create a projected image 24.

Figure 9:
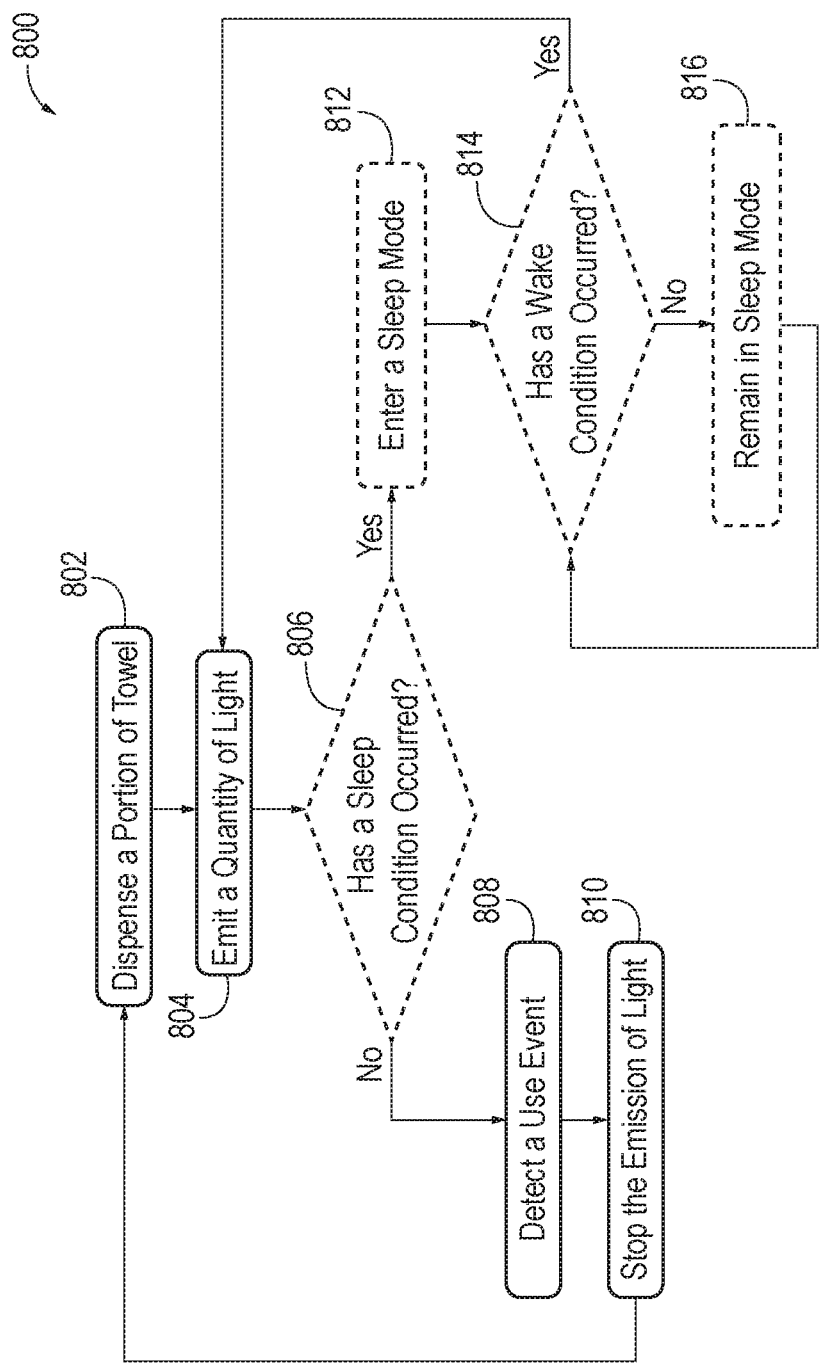
FIG. 9 is a flowchart schematically representing methods for operating projection systems for dispensed paper towel, according to the present disclosure.

FIG. 9 schematically provides a flowchart that represents illustrative, non-exclusive examples of methods according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

FIG. 9 illustrates a method 800 of operating a paper towel dispenser having a projection system. At operation 802, a paper towel dispenser having a projection system (e.g., paper towel dispenser 10) dispenses a portion of paper towel (e.g., portion 18 of paper towel 14). In some embodiments, the paper towel dispenser includes a dispensing mechanism (e.g., dispensing mechanism 16) configured to cause the portion of paper towel to be dispensed into a region (e.g., region 30) outside of the paper towel dispenser.

At operation 804, a projection system of the paper towel dispenser emits a quantity of light (e.g., light 22) that strikes the portion of paper towel. For example, a projector (e.g., projector 20) configured to emit a quantity of light that strikes the portion of paper towel, and creates a projected image (e.g., projected image 24) on the portion of paper towel. When the paper towel dispenser includes a backlit projection system, the portion of paper towel comprises a back surface (e.g., back surface 40) that faces the projector, and a front surface (e.g., front surface 42) that is opposite the back surface. The quantity of light strikes the back surface of the portion of paper towel such that the projected image is visible on the front surface of the portion of paper towel. When the paper towel dispenser includes a frontlit projection system, the quantity of light strikes the front surface of the portion of paper towel such that the projected image is visible on the front surface of the portion of paper towel.

In some embodiments, emitting the quantity of light at 804 comprises emitting the quantity of light from a light source (e.g., light source 36) such that the quantity of light strikes a GOBO (e.g., GOBO 38) before striking the portion of paper towel, and wherein the GOBO is configured to cause the quantity of light that strikes the portion of paper towel to create the projected image on the portion of paper towel. The projected image may be a static image, a dynamic image (e.g., slide show, video, animation, etc.), or a combination thereof. In some embodiments, emitting a quantity of light at 804 may correspond to turning on the projector and/or the light source associated with the projector. Alternatively or in addition, emitting the quantity of light at 804 may correspond to removing an obstruction that obscures the light from being emitted by the projection system for dispensed paper towels. For example, the obstruction may include, but is not limited to, a shutter, a cam, a slide, etc.

At operation 806, the paper towel dispenser determines whether a sleep condition has occurred. A sleep condition may include, but is not limited to, one or more of a lavatory door being open, non-use for a predetermined period of time, no motion being detected in the environment for a period of time, an external light source being off, a time schedule, etc. The paper towel dispenser may determine whether a sleep condition has occurred based on input from one or more sensors (e.g., sensors 46).

If at operation 806 the paper towel dispenser determines that a sleep condition has occurred, method 800 continues at operation 808, where the paper towel dispenser detects a usage event. A usage event corresponds to at least one of a tearing, a usage, and/or a removal of the portion of paper towel. In some embodiments, detecting the usage event at 808 comprises detecting a tension force on the portion of paper towel, and/or detecting an absence of the portion of paper towel. For example, one or more sensors of the paper towel dispenser may detect that the portion of paper towel is no longer within the region outside of the paper towel dispenser. Alternatively or in addition, detecting the usage event at 808 may comprise the one or more sensors of the paper towel dispenser detecting the presence of an object in a region proximate to the portion of paper towel.

The method 800 then continues at operation 810, where the paper towel dispenser stops the emission of light such that the quantity of light does not strike the portion of paper towel. In some embodiments, stopping the emission of light comprises turning off the projector and/or the associated light source. Alternatively, stopping the emission of light may comprise causing an obstruction to obscure and/or redirect the light such that light is no longer emitted by the projection system for dispensed paper towels. The method 800 then continues at operation 802, where the paper towel dispenser dispenses an additional portion of paper towel.

If at operation 806 the paper towel dispenser determines that a sleep condition has occurred, method 800 continues at operation 812, where the paper towel dispenser enters a sleep mode of operation. A sleep mode of operation may correspond to a mode of operation where the quantity of light does not strike the portion of paper towel based on a sleep condition having occurred. This may include, but is not limited to, a mode where one of the projector and the associated light source are turned off.

At operation 814, the paper towel dispenser determines whether a wake condition has occurred. A wake condition may include, but is not limited to, one or more of a lavatory door being closed, a lavatory door being locked, a use of the paper towel dispenser, a motion being detected in the environment, an external light source being on, and a time schedule.

If at operation 814 the paper towel dispenser determines that a wake condition has not occurred, method 800 continues at operation 816, and the paper towel dispenser remains in sleep mode. However, if at operation 814 the paper towel dispenser determines that a wake condition has occurred, method 800 continues at operation 804, and the projection system of the paper towel dispenser emits a quantity of light that strikes the portion of paper towel.

A microcontroller 44 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Additionally or alternatively, computing device 56 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Illustrative, non-exclusive examples of inventive subject matter according to the present disclosure are described in the following enumerated paragraphs:

A1. A paper towel dispenser having a projection system comprising:

a paper towel holder configured to securely retain a supply of paper towel during use of the paper towel dispenser;

a dispensing mechanism configured to cause a portion of paper towel to be dispensed out of the paper towel dispenser; and a projector configured to emit a quantity of light that strikes the portion of paper towel to create a projected image on the portion of paper towel when the portion of paper towel is dispensed out of the paper towel dispenser.

A1.1. The paper towel dispenser of paragraph A1, wherein the projector is a video projector and the projected image is a video image.

A1.2. The paper towel dispenser of any of paragraphs A1-A1.1, wherein the projector is one of a liquid crystal display (LCD) projector, a digital light processing (DLP) projector, a GOBO projector, a micro projector, a laser light projector, and the likes thereof.

A1.3. The paper towel dispenser of paragraph A1, wherein the projector comprises:

a light source positioned so as to emit the quantity of light that strikes the portion of paper towel when the portion of paper towel is dispensed out of the paper towel dispenser; and a GOBO positioned between the light source and the portion of paper towel when the portion of paper towel is dispensed out of the paper towel dispenser, wherein the GOBO is configured to cause the quantity of light that strikes the portion of paper towel to create the projected image on the portion of paper towel.

A1.3.1. The paper towel dispenser of paragraph A1.3, wherein the GOBO is a lens having a pattern, and wherein the projected image is caused by the pattern.

A1.3.1.1. The paper towel dispenser of paragraph A1.3.1, wherein the pattern is etched on the lens.

A1.3.1.2. The paper towel dispenser of paragraph A1.3.1, wherein the pattern is printed on the lens.

A1.3.2. The paper towel dispenser of any of paragraphs A3-A1.3.1.2, wherein the GOBO is a pattern etched or printed on the lens of the light source.

A1.3.3. The paper towel dispenser of any of paragraphs A1.3-A1.3.2, wherein the GOBO is a slide having a pattern printed on it.

A1.3.4. The paper towel dispenser of any of paragraphs A1.3-A1.3.3, wherein the GOBO is an object defining an aperture that causes the quantity of light that strikes the portion of paper towel to create a projected image.

A1.3.5. The paper towel dispenser of any of paragraphs A1.3-A1.3.4, wherein the GOBO is an object having a shape that causes the quantity of light that strikes the portion of paper towel to create a projected image.

A1.3.6. The paper towel dispenser of any of paragraphs A1.3-A3.5, wherein the GOBO is configured to be selectively removed and replaced without damage to the paper towel dispenser.

A1.3.7. The paper towel dispenser of any of paragraphs A1.3-A1.3.6, wherein the GOBO is a dynamic GOBO and the projected image is a video image.

A2. The paper towel dispenser of any of paragraphs A1-A1.3.7, wherein the portion of paper towel comprises a back surface and a front surface that is opposite the back surface, and wherein the quantity of light strikes the back surface or the front surface of the portion of paper towel.

A2.1. The paper towel dispenser of paragraph A2, wherein the back surface of the portion of paper towel faces the projector, wherein the quantity of light strikes the back surface of the portion of paper towel, and wherein the projected image is visible on the front surface of the portion of paper towel.

A2.1.1. The paper towel dispenser of paragraph A2, wherein when the quantity of light strikes the back of the portion of paper towel a reverse image is formed on the back surface, such that the projected image is visible on the front surface in the correct orientation.

A2.2. The paper towel dispenser of any of paragraph A2, wherein the front surface of the portion of paper towel faces the projector, wherein the quantity of light strikes the front surface of the portion of paper towel, and wherein the projected image is visible on the front surface of the portion of paper towel.

A3. The paper towel dispenser of any of paragraphs A1-A2.2, wherein the dispensing mechanism includes: a motor configured to cause the portion of paper towel to be dispensed out of the paper towel dispenser; and an energy source.

A3.1. The paper towel dispenser of paragraph A3, wherein the energy source is a battery.

A3.2. The paper towel dispenser of paragraph A3, wherein the energy source is an electrical connection to an electrical grid.

A4. The paper towel dispenser of any of paragraphs A1-A3.2, further comprising a microcontroller configured to cause the projector to switch between an on state where the projector emits the quantity of light and an off state where the projector does not emit the quantity of light.

A4.1. The paper towel dispenser of paragraph A4 when depending from paragraph A3, wherein the microcontroller is further configured to control the motor.

A5. The paper towel dispenser of any of paragraphs A1-A4.1, wherein the paper towel dispenser is configured to detect a usage event, wherein the usage event corresponds to one of a tearing, a usage, and/or a removal of the portion of paper towel.

A5.1. The paper towel dispenser of paragraph A5, wherein detecting the usage event comprises detecting a tension force on the portion of paper towel.

A5.2. The paper towel dispenser of any of paragraphs A5-A5.1, further comprising one or more sensors configured to detect the usage event, the one or more sensors including at least one of an infrared sensor, a camera sensor, a light sensor, a proximity sensor, and a mechanical sensor.

A5.2.1. The paper towel dispenser of paragraphs A5.2, wherein the one or more sensors are configured to detect the usage event at least in part on a detection of an absence of the portion of paper towel.

A5.2.2. The paper towel dispenser of any of paragraphs A5.2-A5.2.1, wherein the one or more sensors are configured to detect the usage event at least in part on a detection of the presence of an object in a region proximate to the portion of paper towel.

A5.3. The paper towel dispenser of any of paragraphs A5-A5.2.2, wherein one of the dispensing mechanism and the motor is configured to detect the usage event.

A5.3.1. The paper towel dispenser of paragraph A5.3 when depending from paragraph A3, wherein the motor is configured to detect a pulling of the portion of paper towel.

A6. The paper towel dispenser of any of paragraphs A5-A5.3.1 when depending from paragraph A4, wherein the microcontroller is configured to cause the projector to switch to the off state in response to the detection of the usage event.

A7. The paper towel dispenser of any of paragraphs A5-A6 when depending from paragraph A4, wherein the microcontroller is further configured to cause the dispensing mechanism to cause an additional portion of paper towel to be dispensed out of the paper towel dispenser based on the usage event.

A7.1. The paper towel dispenser of paragraph A7, wherein the microcontroller is configured to cause the dispensing mechanism to dispense the additional portion of paper towel based on a passage of a predetermined amount of time from the usage event.

A7.1.1. The paper towel dispenser of paragraph A7.1, wherein the microcontroller is further configured to cause the projector to switch to the on state in response to the additional portion of paper towel being dispensed out of the paper towel dispenser.

A7.1.2. The paper towel dispenser of paragraph A7.1, wherein the microcontroller is further configured to cause the projector to switch to the on state based on an operation of the dispensing mechanism.

A7.1.3. The paper towel dispenser of paragraph A7.1, wherein the microcontroller is further configured to cause the projector to switch to the on state based on an initiation of the motor.

A8. The paper towel dispenser of any of paragraphs A4-A7.1.3, wherein the microcontroller is configured to determine that a sleep condition has occurred, and to cause the projector to switch to the off state based on the sleep condition having occurred.

A8.1. The paper towel dispenser of paragraph A8, wherein the sleep condition corresponds to at least one of a lavatory door being open, non-use for a predetermined period of time, no motion being detected in the environment for a period of time, an external light source being off, a time schedule.

A9. The paper towel dispenser of any of paragraphs A4-A8.1, wherein the microcontroller is further configured to determine that a wake condition has occurred, and based on the wake condition having occurred, the microcontroller is configured to cause the projector to switch to the on state.

A9.1. The paper towel dispenser of paragraph A9, wherein the wake condition corresponds to at least one of a lavatory door being closed, a lavatory door being locked, a use of the paper towel dispenser, a motion being detected in the environment, an external light source being on, and a time schedule.

A10. The paper towel dispenser of any of paragraphs A1-A9.1, wherein the paper towel dispenser is mounted on a surface, and the projector is positioned between the surface and the portion of paper towel when the portion of paper towel is dispensed out of the paper towel dispenser.

A11. The paper towel dispenser of any of paragraphs A1-A10, wherein the projected image includes a branded image.

A12. The paper towel dispenser of any of paragraphs A1-A11, wherein the projected image includes multiple images.

A13. The paper towel dispenser of any of paragraphs A1-A12, further comprising at least one additional projector, wherein the at least one additional projector is positioned to emit an additional quantity of light such that strikes the portion of paper towel when the portion of paper towel is dispensed out of the paper towel dispenser.

A13.1. The paper towel dispenser of paragraph A13 when dependent from any of paragraphs A1.3-A1.3.7, wherein the at least one additional projector comprises at least one additional light source configured to emit the additional quantity of light, and the GOBO is further positioned between the at least one additional light source and the portion of paper towel when the portion of paper towel is dispensed out of the paper towel dispenser, wherein the GOBO is configured to cause the additional quantity of light that strikes the portion of paper towel to create an additional projected image.

A13.2. The paper towel dispenser of any of paragraphs A13-A13.1, wherein the microcontroller is further configured to cause the at least one additional projector to switch between an on state where the at least one additional projector emits the additional quantity of light and an off state where the at least one additional projector does not emit the additional quantity of light.

A14. The paper towel dispenser of any of paragraphs A1.3-A13.2, further comprising a second GOBO.

A14.1. The paper towel dispenser of paragraph A14, wherein the second GOBO is positioned between the light source and the portion of paper towel when the portion of paper towel is dispensed out of the paper towel dispenser, wherein the GOBO is configured to cause the quantity of light that strikes the portion of paper towel to create an additional projected image.

A14.2. The paper towel dispenser of any of paragraphs A14-A14.1 when dependent from paragraph A13.1, wherein the at least one additional projector comprises at least one additional light source configured to emit the additional quantity of light, wherein the second GOBO is positioned between the at least one additional light source and the portion of paper towel when the portion of paper towel is dispensed out of the paper towel dispenser, wherein the GOBO is configured to cause the additional quantity of light that strikes the portion of paper towel to create an additional projected image.

A15. The paper towel dispenser of paragraph A4-A14.2, wherein the microcontroller is further configured to determine status information indicative of a status of the paper towel dispenser, and the paper towel dispenser further comprises a transmitter configured to transmit data indicating the status information to a computing device external to the paper towel dispenser.

A15.1. The paper towel dispenser of paragraph A15, wherein the transmitter is a wireless transmitter.

A15.2. The paper towel dispenser of paragraph A15, wherein the status information corresponds to one or more of a battery power level, an amount of paper towel dispensed, an amount of paper towel remaining, an operational status of the paper towel dispenser, and a detection of an operational fault.

B1. A method of operating a paper towel dispenser having a projection system, the method comprising:
dispensing a portion of paper towel out of the paper towel dispenser; and
emitting a quantity of light from a projector such that the quantity of light strikes the portion of paper towel to create a projected image on the portion of paper towel.

B1.1. The method of paragraph B, wherein the emitting the quantity of light from the projector comprises emitting the quantity of light from a light source such that the quantity of light strikes the portion of paper towel, wherein the quantity of light strikes a GOBO before striking the portion of paper towel, and wherein the GOBO is configured to cause the quantity of light that strikes the portion of paper towel to create the projected image on the portion of paper towel.

B2. The method of any of paragraphs B1-B1.1, wherein the portion of paper towel comprises a back surface and a front surface that is opposite the back surface, wherein the quantity of light strikes the back surface or the front surface of the portion of paper towel.

B2.1. The method of paragraph B2, wherein the back surface of the portion of paper towel faces the projector, wherein the quantity of light strikes the back surface of the portion of paper towel, and wherein the projected image is visible on the front surface of the portion of paper towel.

B2.2. The method of paragraph B2, wherein the front surface of the portion of paper towel faces the projector, wherein the quantity of light strikes the front surface of the portion of paper towel, and wherein the projected image is visible on the front surface of the portion of paper towel.

B3. The method of any of paragraphs B1-B2.2, further comprising, detecting a usage event, wherein the usage event corresponds to at least one of a tearing, a usage, and/or a removal of the portion of paper towel.

B3.1. The method of paragraph B3, wherein detecting the usage event comprises detecting a tension force on the portion of paper towel.

B3.2. The method of any of paragraphs B3-B3.1, wherein detecting the usage event comprises one or more sensors of the paper towel dispenser detecting an absence of the portion of paper towel.

B3.3. The method of any of paragraphs B3-B3.2, wherein detecting the usage event comprises the one or more sensors of the paper towel dispenser detecting the presence of an object in a region proximate to the portion of paper towel.

B3.4. The method of any of paragraphs B3-B3.3, wherein detecting the usage event comprises a motor of the paper towel dispenser registering a pulling of the portion of paper towel.

B4. The method of any of paragraphs B1-B3.4, further comprising stopping the quantity of light from striking the portion of paper towel.

B4.1. The method of paragraph B4, wherein stopping the quantity of light from striking the portion of paper towel comprises turning off the projector.

B4.2. The method of any of paragraphs B4-B4.1, wherein stopping the quantity of light from striking the portion of paper towel comprises obstructing the quantity of light.

B4.3. The method of any of paragraphs B4-B4.2, wherein stopping the quantity of light from striking the portion of paper towel comprises redirecting the quantity of light.

B5. The method of any of paragraphs B1-B4.3, further comprising dispensing an additional portion of paper towel.

B6. The method of any of paragraphs B1-B5, further comprising determining whether a sleep condition has occurred, wherein the sleep condition corresponds to one of a lavatory door being open, non-use for a predetermined period of time, no motion being detected in the environment for a period of time, an external light source being off, and a time schedule.

B6.1. The method of paragraph B6, further comprising causing the paper towel dispenser to enter a sleep mode where the quantity of light does not strike the portion of paper towel based on a sleep condition having occurred.

B7. The method of any of paragraphs B1-B6.1, further comprising determining whether a wake condition has occurred, wherein the wake condition corresponds to one of a lavatory door being closed, a lavatory door being locked, a use of the paper towel dispenser, a motion being detected in the environment, an external light source being on, a time schedule.

B7.1. The method of paragraph B7, further comprising causing the paper towel dispenser to remain in sleep mode based on the wake condition having not occurred.

B7.2. The method of paragraph B7, further comprising causing a quantity of light from the projector to be emitted such that the quantity of light strikes the portion of paper towel based on the wake condition having occurred.

B8. The method of any of paragraphs B1-B7.2, performed by the paper towel dispenser of paragraphs A1-A15.2.

B9. The method of any of paragraphs B1-B7.2, performed by the aircraft of paragraphs C1-C36.2.

C1. A system that includes a paper towel dispenser having a projection system, comprising:
a cabinet housing that defines an inner volume; and a housing aperture defined by the cabinet housing, the housing aperture being configured to allow a portion of paper towel to be dispensed from the inner volume to a region outside of the cabinet housing, wherein the cabinet housing comprises a vanity cover configured to selectively transition between an open state in which the inner volume is accessible, and a closed state in which the inner volume is not accessible;
a paper towel holder within the inner volume and configured to securely retain a supply of paper towel;
a dispensing mechanism positioned within the inner volume and configured to cause the portion of paper towel to be dispensed from the inner volume to the region outside of the cabinet housing via the housing aperture; and
a projector configured to emit a quantity of light that strikes the portion of paper towel to create a projected image on the portion of paper towel when the portion of paper towel is dispensed out of the cabinet housing.

C1.1. The system of paragraph C1, further comprising: a suppression casing positioned within the inner volume, and comprising: a suppression wall defining an enclosed storage volume, wherein the paper towel holder is positioned within the enclosed storage volume; and a suppression aperture defined by the suppression wall and configured to allow the portion of paper towel to be dispensed from within the enclosed storage volume to the dispensing mechanism, wherein the dispensing mechanism is located outside of the suppression casing.

C.1.2. The system of any of paragraphs C1-C1.1, wherein the system is a transportation vehicle.

C.1.2.1. The system of paragraph C1.2, wherein the transportation vehicle is one of an airplane, a rotorcraft, a spacecraft, a train, a car, a bus, a maritime vehicle, a submissive vehicle, and a modular structure.

C.1.3. The system of any of paragraphs C1-C1.1, wherein the system is a building structure.

C2. The system of any of paragraphs C1-C1.1, wherein the dispensing mechanism is configured to automatically dispense the portion of paper towel.

C2.1. The system of any of paragraphs C1-C2, wherein the dispensing mechanism is composed of a low flammability material.

C2.1.1. The system of paragraph C2.1, wherein the dispensing mechanism is composed of materials that comply with stringent flammability requirements specifically and uniquely for system environments.

C3. The system of any of paragraphs C1-C2.1.1, further comprising a motor configured to drive the dispensing mechanism.

C3.1. The system of paragraph C3, further comprising a power source configured to drive the motor.

C3.1.1. The system of paragraph C3.1, wherein the power source comprises a battery.

C3.1.2. The system of paragraph C3.1, wherein the power source comprises a connection to an electrical system of the system.

C4. The system of any of paragraphs C1.1-C3.1.2, wherein the suppression wall includes an access door configured to selectively transition between an open state in which the supply of paper towel can be refilled or removed from the paper towel holder, and a closed state in which the supply of paper towel is secured within the enclosed storage volume.

C4.1. The system of paragraph C4, wherein the access door includes a latch configured to selectively retain the access door in the closed state.

C5. The system of any of paragraphs C1.1-C4.1, wherein the suppression wall is partially or completely composed of a low flammability material.

C5.1. The system of paragraph C5, wherein the suppression wall is composed of materials that comply with stringent flammability requirements specifically and uniquely for system environments.

C6. The system of any of paragraphs C1.1-C5.1, wherein the suppression wall is configured to limit a flow of air into the enclosed storage volume.

C6.1. The system of paragraph C6, wherein the suppression wall is configured so that air is only allowed into the enclosed storage volume via the suppression aperture.

C7. The system of any of paragraphs C1.1-C6, wherein the suppression aperture is shaped to allow the portion of paper towel to be dispensed from within the enclosed storage volume while limiting the flow of air into the enclosed storage volume.

C7.1. The system of paragraph C7, wherein the suppression aperture is shaped so that the flow of air into the enclosed storage volume via the suppression aperture is insufficient to deliver oxygen to sustain a flame within the enclosed storage volume.

C8. The system of any of paragraphs C6-C7.1, wherein limiting the flow of oxygen into the enclosed storage volume is sufficient to cause an ignited portion of paper towel within the enclosed storage volume to be extinguished due to lack of oxygen.

C9. The system of any of paragraphs C1-C8, wherein the cabinet housing is operatively coupled to a frame of the system.

C9.1. The system of paragraph C9, wherein the cabinet housing is operatively coupled to a frame of a wall of a lavatory of the system.

C10. The system of any of paragraphs C1.1-C9.1, wherein the suppression wall is directly coupled to the frame of a wall of the lavatory of the system.

C11. The system of any of paragraphs C1-C10, further comprising a hand sensor.

C11.1. The system of paragraph C11, wherein the dispensing mechanism is configured to dispense the portion of paper towel in response to sensor data from the hand sensor.

C12. The system of any of paragraphs C1-C11.1, wherein the paper towel dispenser further comprises a sensor that is configured to detect that the paper towel has been removed.

C13. The system of paragraph C12, wherein the dispensing mechanism is configured to dispense an additional portion of paper towel after a predetermined period of time has passed after the portion of paper towel is removed.

C14. The system of any of paragraphs C1-C13, wherein the vanity cover includes a mirror.

C15. The system of any of paragraphs C1-C14, wherein the vanity cover includes shelving configured to store one or more objects.

C16. The system of any of paragraphs C1-C15, wherein the vanity cover is at least a portion of a lavatory vanity of the system.

C17. The system of any of paragraphs C1-C16, wherein the vanity cover includes a latch to selectively retain the vanity cover in the closed state.

C18. The system of any of paragraphs C1-C17, further comprising: a microcontroller configured to determine status information indicative of a status of the system; and a transmitter configured to transmit data describing the status information to a computing device external to the system.

C18.1. The system of paragraph C18, wherein the transmitter is a wireless transmitter.

C18.2. The system of any of paragraphs C18-C18.1, wherein the computing device is located on the system.

C18.3. The system of any of paragraphs C18-C18.1, wherein the computing device is external to the system.

C18.4. The system of any of paragraphs C18-C18.3, wherein the system further includes one or more sensors configured to detect sensor information relating to the status of the system.

C18.4.1. The system of paragraph C18.4, wherein the microcontroller determines the status information based on the sensor information.

C18.4.2. The system of any of paragraphs C18.4-C18.4.1, wherein the one or more sensors are configured to detect at least one of a paper towel jam, a malfunction of the dispensing mechanism, a usage of the paper towel dispenser, an amount of the supply of paper towel dispensed, and an amount of the supply of paper towel remaining in the enclosed volume.

C18.5. The system of any of paragraphs C18-C18.4.2, wherein the microcontroller is configured to determine, based on the status information, that an operational fault of the paper towel dispenser has occurred.

C18.5.1. The system of paragraph C18.5, wherein the operational fault corresponds to one of a low battery, a paper jam, a low paper towel level, and the paper towel dispenser being inoperative.

C18.5.2. The system of any of paragraphs C18.5-C18.5.1, wherein responsive to the microcontroller determining that the operational fault has occurred, the microcontroller is further configured to cause the transmitter to transmit a notification that the operational fault has occurred to the computing device external from the paper towel dispenser.

C18.5.2.1. The system of paragraph C18.5.2, wherein the microcontroller is further configured to determine that, after the notification is transmitted, an action has not been taken, and cause the transmitter to transmit an additional notification that the operational fault has occurred to a second computing device.

C18.5.2.1.1. The system of paragraph C8.5.2.1, wherein the second computing device is external to the system.

C18.5.2.2. The system of any of paragraphs C18.5.2, wherein the microcontroller is further configured to determine that, after the notification is transmitted, an action has been taken to address the operational fault, determine that the operational fault is still present after the action has been taken, and cause the transmitter to transmit an additional notification that the operational fault is still present.

C18.5.2.3. The system of paragraph C18.5.2, wherein the microcontroller is further configured to determine that a predetermined time period has passed without an action being taken to address the operational fault, and cause the transmitter to transmit an additional notification that the operational fault is still present.

C19. The system of any of paragraphs C1.1-C18.5.2.3, further comprising an additional suppression casing comprising: an additional suppression wall defining an additional enclosed storage volume; an additional paper towel holder coupled to the additional suppression wall and configured to securely retain an additional supply of paper towel; and an additional suppression aperture defined by the suppression wall and configured to allow an additional portion of paper towel to be dispensed from within the additional enclosed storage volume and to the dispensing mechanism.

C19.1. The system of paragraph C19, wherein when the vanity cover is in the open state, the additional suppression casing is accessible.

C19.2. The system of any of paragraphs C19-C19.1, wherein when the vanity cover is in the closed state the additional suppression casing is obscured from view by the vanity cover.

C20. The system of any of paragraphs C1-C19.2, wherein the suppression casing further comprises an additional paper towel holder coupled to the suppression wall and configured to securely retain the additional supply of paper towel within the enclosed volume.

C20.1. The system of paragraph C20, wherein the suppression casing further comprises an additional suppression aperture defined by the suppression wall and configured to allow the additional portion of paper towel to be dispensed from within the an enclosed storage volume and to the dispensing mechanism.

C21. The system of any of paragraphs C1-C20.1, wherein the paper towel held by the paper towel holder comprises a roll of paper towel.

C22. The system of any of paragraphs C1-C21, wherein the projector is a video projector and the projected image is a video image.

C23. The system of any of paragraphs C1-C22, wherein the projector is one of a liquid crystal display (LCD) projector, a digital light processing (DLP) projector, a GOBO projector, a micro projector, a laser light projector, and the likes thereof.

C24. The system of any of paragraphs C1-C22, wherein the projector comprises: a light source positioned so as to emit the quantity of light that strikes the portion of paper towel when the portion of paper towel is dispensed out of the cabinet housing via housing aperture; and a GOBO positioned between the light source and the portion of paper towel when the portion of paper towel is dispensed out of the cabinet housing via the housing aperture, wherein the GOBO is configured to cause the quantity of light that strikes the portion of paper towel to create the projected image on the portion of paper towel.

C24.1. The system of paragraph C24, wherein the GOBO is a lens having a pattern, and wherein the projected image is caused by the pattern.

C24.1.1. The system of paragraph C24.1, wherein the pattern is etched on the lens.

C24.1.2. The system of paragraph C24.1, wherein the pattern is printed on the lens.

C24.2. The system of any of paragraphs C1-C24.1.2, wherein the GOBO is a pattern etched or printed on a lens of the light source.

C24.3. The system of any of paragraphs C24-C24.2, wherein the GOBO is a slide having a pattern printed on it.

C24.4. The system of any of paragraphs C24-C24.3, wherein the GOBO is an object defining an aperture that causes the quantity of light that strikes the portion of paper towel to create a projected image.

C24.5. The system of any of paragraphs C24-C24.4, wherein the GOBO is an object having a shape that causes the quantity of light that strikes the portion of paper towel to create a projected image.

C24.6. The system of any of paragraphs C24-C24.5, wherein the GOBO is configured to be selectively removed and replaced without damage to the paper towel dispenser.

C24.7. The system of any of paragraphs C24-C24.6, wherein the GOBO is a dynamic GOBO, and the projected image is a video image.

C25. The system of any of paragraphs C1-C24.7, wherein the portion of paper towel comprises a back surface that faces the projector, and a front surface that is opposite the back surface, wherein the quantity of light strikes the back surface of the portion of paper towel, and wherein the projected image is visible on the front surface of the portion of paper towel.

C25.1. The system of any of paragraphs C1-C24.7, wherein the portion of paper towel comprises a front surface that faces the projector, wherein the quantity of light strikes the front surface of the portion of paper towel, and wherein the projected image is visible on the front surface of the portion of paper towel.

C26. The system of any of paragraphs C1-C25.1, further comprising a microcontroller configured to cause the projector to switch between an on state where the projector emits the quantity of light and an off state where the projector does not emit the quantity of light.

C27. The system of any of paragraphs C1-C26, wherein the system is configured to detect a usage event, wherein the usage event corresponds to one of a tearing, a usage, and/or a removal of the portion of paper towel.

C27.1. The system of paragraph C27, wherein detecting the usage event comprises detecting a tension force on the portion of paper towel.

C27.2. The system of any of paragraphs C27-C27.1, further comprising one or more sensors configured to detect the usage event, the one or more sensors including at least one of an infrared sensor, a camera sensor, a light sensor, a proximity sensor, and a mechanical sensor.

C27.2.1. The system of paragraphs C27.2, wherein the one or more sensors are configured to detect the usage event at least in part on a detection of an absence of the portion of paper towel.

C27.2.2. The system of any of paragraphs C27.2-C27.2.1, wherein the one or more sensors are configured to detect the usage event at least in part on a detection of a presence of an object in a region proximate to the portion of paper towel.

C27.3. The system of any of paragraphs C27-C27.2.2, wherein one of the dispensing mechanism and the motor is configured to detect the usage event.

C27.3.1. The system of paragraphs C27.3 when depending from paragraph C3, wherein the motor is configured to detect a pulling of the portion of paper towel.

C28. The system of any of paragraphs C27-C27.3.1 when depending from paragraph C27, wherein the microcontroller is configured to cause the projector to switch to the off state in response to the detection of the usage event.

C29. The system of any of paragraphs C27-C28 when depending from paragraph C27, wherein the microcontroller is further configured to cause the dispensing mechanism to cause an additional portion of paper towel to be dispensed out of the cabinet housing via the housing aperture based on the usage event.

C29.1. The system of paragraph C29, wherein the microcontroller is configured to cause the dispensing mechanism to dispense the additional portion of paper towel based on a passage of a predetermined amount of time from the usage event.

C29.1.1. The system of paragraph C29.1, wherein the microcontroller is further configured to cause the projector to switch to the on state in response to the additional portion of paper towel being dispensed out of the cabinet housing via housing aperture.

C29.1.2. The system of paragraph C29.1, wherein the microcontroller is further configured to cause the projector to switch to the on state based on an operation of the dispensing mechanism.

C29.1.3. The system of paragraphs C29.1, wherein the microcontroller is further configured to cause the projector to switch to the on state based on an initiation of the motor.

C30. The system of any of paragraphs C29-C29.1.3, wherein the microcontroller is configured to determine that a sleep condition has occurred, and to cause the projector to switch to the off state based on the sleep condition having occurred.

C30.1. The system of paragraph C30, wherein the sleep condition corresponds to at least one of a lavatory door being open, non-use for a predetermined period of time, no motion being detected in the environment for a period of time, an external light source being off, and a time schedule.

C31. The system of any of paragraphs C29-C30.1, wherein the microcontroller is further configured to determine that a wake condition has occurred, and based on the wake condition having occurred, the microcontroller is configured to cause the projector to switch to the on state.

C31.1. The system of paragraph C31, wherein the wake condition corresponds to at least one of a lavatory door being closed, a lavatory door being locked, a use of the paper towel dispenser, a motion being detected in the environment, an external light source being on, and a time schedule.

C32. The system of any of paragraphs C1-C31.1, wherein the paper towel dispenser is mounted on a surface, and the projector is positioned between the surface and the portion of paper towel when the portion of paper towel is dispensed out of the cabinet housing via housing aperture.

C33. The system of any of paragraphs C1-C32, wherein the projected image includes a branded image.

C34. The system of any of paragraphs C1-C33, wherein the projected image includes multiple images.

C35. The system of any of paragraphs C1-C34, further comprising at least one additional projector, wherein the at least one additional projector is positioned to emit an additional quantity of light such that strikes the portion of paper towel when the portion of paper towel is dispensed out of the cabinet housing via housing aperture.

C35.1. The system of paragraph C35 when dependent from any of paragraphs C24-C24.7, wherein the at least one additional projector comprises at least one additional light source configured to emit the additional quantity of light, and the GOBO is further positioned between the at least one additional light source and the portion of paper towel when the portion of paper towel is dispensed out of the cabinet housing via housing aperture, wherein the GOBO is configured to cause the additional quantity of light that strikes the portion of paper towel to create an additional projected image.

C35.2. The system of any of paragraphs C35-C35.1, wherein the microcontroller is further configured to cause the at least one additional projector to switch between an on state where the at least one additional projector emits the additional quantity of light and an off state where the at least one additional projector does not emit the additional quantity of light.

C36. The system of any of paragraphs C24-C35.2 when dependent from C24, further comprising an additional GOBO.

C36.1. The system of paragraph C36, wherein the additional GOBO is positioned between the light source and the portion of paper towel when the portion of paper towel is dispensed out of the cabinet housing via housing aperture, wherein the additional GOBO is configured to cause the quantity of light that strikes the portion of paper towel to create an additional projected image.

C36.2. The system of any of paragraphs C36-C36.1 when dependent from paragraph C24.1, wherein the at least one additional projector comprises at least one additional light source configured to emit the additional quantity of light, wherein the second GOBO is positioned between the at least one additional light source and the portion of paper towel when the portion of paper towel is dispensed out of the cabinet housing via housing aperture, wherein the additional GOBO is configured to cause the additional quantity of light that strikes the portion of paper towel to create an additional projected image.

D1. Use of the paper towel dispenser having a projection system of any of paragraphs A1-A15.2.

E1. Use of the system of any of paragraphs C1-C36.2.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A paper towel dispenser having a projection system comprising:
   a paper towel holder configured to securely retain a supply of paper towel during use of the paper towel dispenser;
   a dispensing mechanism configured to cause a portion of paper towel to be dispensed out of the paper towel dispenser, wherein the portion of paper towel comprises a back surface and a front surface that is opposite the back surface; and
   a projector configured to emit a quantity of light that strikes the back surface or the front surface of the portion of paper towel to create a projected image on the portion of paper towel when the portion of paper towel is dispensed out of the paper towel dispenser.

2. The paper towel dispenser of claim 1, wherein the front surface of the portion of paper towel faces the projector, wherein the quantity of light strikes the front surface of the portion of paper towel, and wherein the projected image is visible on the front surface of the portion of paper towel.

3. The paper towel dispenser of claim 2, wherein the projector comprises:
   a light source positioned so as to emit the quantity of light that strikes the portion of paper towel when the portion of paper towel is dispensed out of the paper towel dispenser; and
   a GOBO positioned between the light source and the portion of paper towel when the portion of paper towel is dispensed out of the paper towel dispenser, wherein the GOBO is configured to cause the quantity of light that strikes the portion of paper towel to create the projected image on the portion of paper towel.

4. The paper towel dispenser of claim 3, wherein the GOBO comprises at least one of:
- an etched lens having a pattern etched thereon;
- a printed lens having the pattern printed thereon;
- a slide having the pattern printed on it;
- an object defining an aperture that causes the quantity of light that strikes the portion of paper towel to create the projected image; and
- an object having a shape that causes the quantity of light that strikes the portion of paper towel to create the projected image.

5. The paper towel dispenser of claim 3, wherein the GOBO is configured to be selectively removed and replaced without damage to the paper towel dispenser.

6. The paper towel dispenser of claim 2, wherein the dispensing mechanism includes a motor configured to cause the portion of paper towel to be dispensed out of the paper towel dispenser, and an energy source that powers the motor.

7. The paper towel dispenser of claim 2, wherein the paper towel dispenser is configured to detect a usage event, wherein the usage event corresponds to one of a tearing, a usage, and a removal of the portion of paper towel.

8. The paper towel dispenser of claim 7, wherein the usage event comprises at least one of:
- a tension force on the portion of paper towel;
- an absence of the portion of paper towel; and
- a pulling of the portion of paper towel.

9. The paper towel dispenser of claim 7, wherein a microcontroller is further configured to cause the projector to switch to an off state in response to detection of the usage event.

10. The paper towel dispenser of claim 2, further comprising a microcontroller configured to:
- determine that a wake condition has occurred, wherein the wake condition corresponds to at least one of a lavatory door being closed, the lavatory door being locked, a use of the paper towel dispenser, a motion being detected in an environment of the paper towel dispenser, an external light source being on, and a time schedule; and
- cause the projector to switch to an on state based on the wake condition having occurred.

11. The paper towel dispenser of claim 2, further comprising at least one additional projector, wherein the at least one additional projector is positioned to emit an additional quantity of light such that strikes the portion of paper towel when the portion of paper towel is dispensed out of the paper towel dispenser.

12. The paper towel dispenser of claim 2, wherein the projector is a video projector and the projected image is a video image.

13. A system, comprising:
- the paper towel dispenser of claim 1;
- a cabinet housing that defines an inner volume; and
- a housing aperture defined by the cabinet housing, the housing aperture being configured to allow the portion of paper towel to be dispensed from the inner volume to a region outside of the cabinet housing, wherein the cabinet housing comprises a vanity cover configured to selectively transition between an open state in which the inner volume is accessible, and a closed state in which the inner volume is not accessible;
- wherein the paper towel holder is positioned within the inner volume and is configured to securely retain the supply of paper towel within the inner volume; and
- wherein the dispensing mechanism is positioned within the inner volume and is configured to cause the portion of paper towel to be dispensed from the inner volume to the region outside of the cabinet housing via the housing aperture.

14. The system of claim 13, further comprising a suppression casing positioned within the inner volume, wherein the suppression casing comprises:
- a suppression wall defining an enclosed storage volume, wherein the paper towel holder is positioned within the enclosed storage volume; and
- a suppression aperture defined by the suppression wall and configured to allow the portion of paper towel to be dispensed from within the enclosed storage volume to the dispensing mechanism, wherein the dispensing mechanism is located outside of the suppression casing;
- wherein the suppression aperture is shaped to allow the portion of paper towel to be dispensed from within the enclosed storage volume while limiting a flow of air into the enclosed storage volume, and wherein the suppression aperture is shaped so that the flow of air into the enclosed storage volume via the suppression aperture is insufficient to deliver oxygen to sustain a flame within the enclosed storage volume.

15. The system of claim 14, further comprising a microcontroller configured to cause the projector to switch between an on state where the projector emits the quantity of light and an off state where the projector does not emit the quantity of light;
- wherein the system is configured to detect a usage event, wherein the usage event corresponds to one of a tearing, a usage, or a removal of the portion of paper towel; and
- wherein the microcontroller is configured to cause the projector to switch to the off state in response to detection of the usage event.

16. The system of claim 15,
- wherein the microcontroller is further configured to cause the dispensing mechanism to cause an additional portion of paper towel to be dispensed out of the cabinet housing via the housing aperture based on the usage event;
- wherein the microcontroller is configured to cause the dispensing mechanism to dispense the additional portion of paper towel based on a passage of a predetermined amount of time from the usage event; and
- wherein:
  - the microcontroller is further configured to cause the projector to switch to the on state in response to the additional portion of paper towel being dispensed out of the cabinet housing via the housing aperture;
  - the microcontroller is further configured to cause the projector to switch to the on state based on an operation of the dispensing mechanism; or
  - the microcontroller is further configured to cause the projector to switch to the on state based on an initiation of a motor of the dispensing mechanism.

17. The system of claim 15,
- wherein the microcontroller is further configured to cause the dispensing mechanism to cause an additional portion of paper towel to be dispensed out of the cabinet housing via the housing aperture based on the usage event; and
- wherein the microcontroller is further configured to determine that a sleep condition has occurred, and to cause the projector to switch to the off state based on the sleep condition having occurred.

18. The system of claim 17, wherein the sleep condition corresponds to at least one of a lavatory door being open, non-use for a predetermined period of time, no motion being detected in an environment of the paper towel dispenser for a period of time, an external light source being off, or a time schedule.

19. The system of claim 15,
wherein the microcontroller is further configured to cause the dispensing mechanism to cause an additional portion of paper towel to be dispensed out of the cabinet housing via the housing aperture based on the usage event; and
wherein the microcontroller is further configured to determine that a wake condition has occurred, and based on the wake condition having occurred, the microcontroller is configured to cause the projector to switch to the on state.

20. The system of claim 19, wherein the wake condition corresponds to at least one of a lavatory door being closed, a lavatory door being locked, a use of the paper towel dispenser, a motion being detected in an environment of the paper towel dispenser, an external light source being on, and a time schedule.

21. A method of operating a paper towel dispenser having a projection system, the method comprising:
dispensing a portion of paper towel out of the paper towel dispenser, wherein the portion of paper towel comprises a back surface and a front surface that is opposite the back surface; and
emitting a quantity of light from a projector such that the quantity of light strikes the back surface or the front surface of the portion of paper towel to create a projected image on the portion of paper towel.

22. The method of claim 21, wherein the front surface of the portion of paper towel faces the projector, wherein the quantity of light strikes the front surface of the portion of paper towel, and wherein the projected image is visible on the front surface of the portion of paper towel.

23. The method of claim 22, further comprising, detecting a usage event, wherein the usage event corresponds to at least one of a tearing, a usage, and a removal of the portion of paper towel.

24. The method of claim 23, wherein detecting the usage event comprises at least one of:
detecting a tension force on the portion of paper towel;
detecting an absence of the portion of paper towel;
detecting a presence of an object in a region proximate to the portion of paper towel; and
detecting a pulling of the portion of paper towel.

25. The method of claim 23, further comprising stopping the quantity of light from striking the portion of paper towel based on the paper towel dispenser detecting the usage event.

26. The method of claim 22, further comprising:
determining whether a sleep condition has occurred, wherein the sleep condition corresponds to one of a lavatory door being open, non-use for a predetermined period of time, no motion being detected in an environment of the paper towel dispenser for a period of time, an external light source being off, a time schedule; and
causing the paper towel dispenser to enter a sleep mode where the quantity of light does not strike the portion of paper towel based on the sleep condition having occurred.

27. The method of claim 26, further comprising:
determining that a wake condition has occurred, wherein the wake condition corresponds to one of a lavatory door being closed, the lavatory door being locked, a use of the paper towel dispenser, a motion being detected in an environment of the paper towel dispenser, an external light source being on, a time schedule; and
causing a quantity of light from the projector to be emitted such that the quantity of light strikes the portion of paper towel based on the wake condition having occurred.

* * * * *